(12) United States Patent
Xiong

(10) Patent No.: US 12,386,576 B2
(45) Date of Patent: Aug. 12, 2025

(54) DISPLAY METHOD AND ELECTRONIC DEVICE

(71) Applicant: Huawei Technologies Co., Ltd., Shenzhen (CN)

(72) Inventor: Peng Xiong, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/264,510

(22) PCT Filed: Dec. 17, 2021

(86) PCT No.: PCT/CN2021/139316
§ 371 (c)(1),
(2) Date: Aug. 7, 2023

(87) PCT Pub. No.: WO2022/166434
PCT Pub. Date: Aug. 11, 2022

(65) Prior Publication Data
US 2024/0094973 A1 Mar. 21, 2024

(30) Foreign Application Priority Data
Feb. 7, 2021 (CN) .......................... 202110169838.3

(51) Int. Cl.
*G06F 3/14* (2006.01)
*G06F 11/30* (2006.01)

(52) U.S. Cl.
CPC ........ *G06F 3/1446* (2013.01); *G06F 11/3041* (2013.01); *G06F 11/3051* (2013.01)

(58) Field of Classification Search
CPC . G06F 3/1446; G06F 11/3041; G06F 11/3051
See application file for complete search history.

(56) References Cited

U.S. PATENT DOCUMENTS

2020/0371736 A1* 11/2020 Iversen ................. G06F 3/1446

FOREIGN PATENT DOCUMENTS

| CN | 102096577 A | 6/2011 |
| CN | 104571988 A | 4/2015 |
| CN | 105404486 A | 3/2016 |
| CN | 110958402 A | 4/2020 |

* cited by examiner

*Primary Examiner* — Michael Pervan
(74) *Attorney, Agent, or Firm* — Conley Rose, P.C.

(57) ABSTRACT

An electronic device determines its position in a spliced electronic device, and, based on the position, determines content that should be displayed, to avoid display disorder. In addition, the electronic device determines its position in the spliced electronic device based only on a connection status of an input end, or based on both a connection status of an input end and a control command from another electronic device, where the control command indicates a position of another electronic device in the spliced electronic device. Neither manual intervention nor participation of another device is required.

20 Claims, 6 Drawing Sheets

DISPLAY METHOD AND ELECTRONIC DEVICE

CROSS-REFERENCE TO RELATED APPLICATIONS

This is a National Stage of International Patent Application No. PCT/CN2021/139316 filed on Dec. 17, 2021, which claims priority to Chinese Patent Application No. 202110169838.3 filed on Feb. 7, 2021. Both of the aforementioned applications are hereby incorporated by reference in their entireties.

TECHNICAL FIELD

This application relates to the terminal field, and more specifically, to a display method and an electronic device in the terminal field.

BACKGROUND

Currently, in some display scenarios, for example, a home display scenario, to achieve a better visual effect, a user may splice a plurality of electronic devices having a display function into one electronic device having a relatively large display area, so that a final picture viewed by the user is jointly displayed by the plurality of electronic devices. In other words, each electronic device is responsible for displaying a part of an entire picture. In this case, if an electronic device does not know its position in the entire spliced electronic device, display disorder may occur in the final picture, which greatly affects viewing experience of the user.

In a solution, a spliced electronic device displays a picture, an image capture module collects picture data, an analysis module analyzes the data to determine a position of each electronic device in the spliced electronic device, and finally each electronic device determines, according to its position in the spliced electronic device, content that should be displayed, thereby avoiding display disorder.

It can be learned that the foregoing solution requires participation of an image capture module and an analysis module, and consequently, both complexity and costs are high.

SUMMARY

Embodiments of this application provide a display method and an electronic device, to reduce display complexity and costs while avoiding display disorder.

According to a first aspect, a display method is provided, where the method is applied to a scenario in which a spliced electronic device formed by a plurality of electronic devices is used for displaying. The method is performed by a first electronic device which is any one of the plurality of electronic devices, and the method includes: when none of at least one input end of the first electronic device is connected to another electronic device, determining a position of the first electronic device in the spliced electronic device according to a connection status of the at least one input end; or when the at least one input end includes an input end connected to another electronic device, determining a position in the spliced electronic device according to a received first control command, where the first control command indicates a position of an electronic device sending the first control command in the spliced electronic device, and indicates that the electronic device sending the first control command and the first electronic device are in a same row or a same column, and the electronic device sending the first control command is connected to the first electronic device through one of the at least one input end; and displaying an image corresponding to the first electronic device according to the position of the first electronic device in the spliced electronic device, a first quantity, and a second quantity, where the first quantity is a quantity of electronic devices in a row direction in which the first electronic device is located, and the second quantity is a quantity of electronic devices in a column direction in which the first electronic device is located.

Based on the foregoing technical solution, the first electronic device determines its position in the spliced electronic device, and determines content that should be displayed according to the position, the quantity of the electronic devices in the row direction in which the first electronic device is located, and the quantity of the electronic devices in the column direction in which the first electronic device is located, to avoid display disorder. In addition, the first electronic device can determine its position in the spliced electronic device based only on a connection status of an input end, or based on both a connection status of an input end and a control command from another electronic device, where the control command indicates a position of the another electronic device in the spliced electronic device. It can be learned that when the first electronic device determines its position in the spliced electronic device, neither manual intervention nor participation of another device is required. Therefore, the display method provided in this embodiment of this application has relatively low complexity and costs while avoiding display disorder.

With reference to the first aspect, in some implementations of the first aspect, the first electronic device includes at least one output end, and the method further includes: sending a second control command to a second electronic device, where the second control command indicates that the first electronic device and the second electronic device are in a same row, and indicates the position of the first electronic device in the spliced electronic device, and the second electronic device is an electronic device connected to a first output end of the first electronic device where the first output end is one of the at least one output end.

Based on the foregoing technical solution, when the first electronic device determines its position in the spliced electronic device, the first electronic device may indicate the position to the second electronic device adjacent to the first electronic device, and indicate a position relationship between the first electronic device and the second electronic device, for example, that the first electronic device and the second electronic device are in a same row in the spliced electronic device, so that the second electronic device determines its position in the spliced electronic device according to the position of the first electronic device in the spliced electronic device and the position relationship between the first electronic device and the second electronic device, and then the second electronic device may determine, according to its position in the spliced electronic device, a quantity of electronic devices in a row direction of the second electronic device, and a quantity of electronic devices in a column direction of the second electronic device, content that should be displayed, to avoid display disorder. It can be learned that when the second electronic device determines its position in the spliced electronic device, neither manual intervention nor participation of another device is required. Therefore, the display method provided in this embodiment of this application has relatively low complexity and costs while avoiding display disorder.

With reference to the first aspect and the foregoing implementations, in some implementations of the first aspect, the method further includes: receiving a first feedback command from the second electronic device, where the first feedback command indicates that the position of each electronic device in a same row as the second electronic device has been determined, and indicates the first quantity.

Based on the foregoing technical solution, the first electronic device may determine, by receiving the first feedback command from the second electronic device, that the position of each electronic device in a same row as the first electronic device has been determined, and may determine a quantity of the electronic devices in the same row as the first electronic device.

With reference to the first aspect and the foregoing implementations, in some implementations of the first aspect, when the at least one input end includes an input end connected to another electronic device, the method further includes: sending the first feedback command to a third electronic device, where the third electronic device is an electronic device connected to a first input end of the first electronic device, and the first input end is one of the at least two input ends.

With reference to the first aspect and the foregoing implementations, in some implementations of the first aspect, the first electronic device includes two output ends, and the method further includes: sending a third control command to a fourth electronic device, where the third control command indicates that the first electronic device and the fourth electronic device are in a same column, and indicates the position of the first electronic device in the spliced electronic device, and the fourth electronic device is an electronic device connected to a second output end of the first electronic device, where the second output end is one of the two output ends other than the first output end.

Based on the foregoing technical solution, when the first electronic device determines its position in the spliced electronic device, the first electronic device may indicate the position to the fourth electronic device adjacent to the first electronic device, and indicate a position relationship between the first electronic device and the fourth electronic device, for example, that the first electronic device and the fourth electronic device are in a same row in the spliced electronic device, so that the fourth electronic device determines its position in the spliced electronic device according to the position of the first electronic device in the spliced electronic device and the position relationship between the first electronic device and the fourth electronic device, and then the fourth electronic device may determine, according to its position in the spliced electronic device, a quantity of electronic devices in a row direction of the fourth electronic device, and a quantity of electronic devices in a column direction of the fourth electronic device, content that should be displayed, to avoid display disorder. It can be learned that when the fourth electronic device determines its position in the spliced electronic device, neither manual intervention nor participation of another device is required. Therefore, the display method provided in this embodiment of this application has relatively low complexity and costs while avoiding display disorder.

With reference to the first aspect and the foregoing implementations, in some implementations of the first aspect, the method further includes: receiving a second feedback command from the fourth electronic device, where the second feedback command indicates that the position of each electronic device in a same column as the fourth electronic device has been determined, and indicates the second quantity.

Based on the foregoing technical solution, the first electronic device may determine, by receiving the second feedback command from the fourth electronic device, that the position of each electronic device in a same column as the first electronic device has been determined, and may determine a quantity of the electronic devices in the same column as the first electronic device.

With reference to the first aspect and the foregoing implementations, in some implementations of the first aspect, the first electronic device includes two input ends, and the method further includes: sending the second feedback command to a fifth electronic device, where the fifth electronic device is an electronic device connected to a second input end of the first electronic device, and the second input end is one of the at least two input ends other than the first input end.

With reference to the first aspect and the foregoing implementations, in some implementations of the first aspect, a first interface is deployed at each input end, and the method further includes: if a high-level signal can be detected on the first interface, determining that an input end at which the first interface is deployed is connected to another electronic device.

With reference to the first aspect and the foregoing implementations, in some implementations of the first aspect, a second interface is deployed at each output end, and the method further includes: if a high-level signal can be detected on the second interface, determining that an output end at which the second interface is deployed is connected to another electronic device.

According to a second aspect, an electronic device is provided, including: a display screen, configured to display a picture corresponding to the electronic device; and one or more processors, a memory, and one or more programs, where the one or more programs are stored in the memory, and when the one or more programs are executed by the processor, the electronic device is enabled to perform the following steps: when none of at least one input end of the electronic device is connected to another electronic device, determining a position of the electronic device in a spliced electronic device according to a connection status of the at least one input end; when the at least one input end includes an input end connected to another electronic device, determining, according to a received first control command, a position in the spliced electronic device, where the first control command indicates a position of an electronic device sending the first control command in the spliced electronic device, and indicates that the electronic device sending the first control command and the electronic device are in a same row or a same column, and the electronic device sending the first control command is connected to the electronic device through one of the at least one input end; and displaying a picture corresponding to the electronic device according to the position of the electronic device in the spliced electronic device, a first quantity, and a second quantity, where the first quantity is a quantity of electronic devices in a row direction in which the electronic device is located, and the second quantity is a quantity of electronic devices in a column direction in which the electronic device is located.

With reference to the second aspect, in some implementations of the second aspect, the electronic device includes at least one output end, and when the one or more programs are executed by the processor, the electronic device is enabled to perform the following steps: sending a second control command to a second electronic device, where the second control command indicates that the electronic device and the second electronic device are in a same row, and indicates the position of the electronic device in the spliced electronic device, the second electronic device is an electronic device connected to a first output end of the electronic device, and the first output end is one of the at least one output end.

With reference to the second aspect and the foregoing implementations, in some implementations of the second aspect, when the one or more programs are executed by the processor, the electronic device is enabled to perform the following steps: receiving a first feedback command from the second electronic device, where the first feedback command indicates that the position of each electronic device in a same row as the second electronic device has been determined, and indicates the first quantity.

With reference to the second aspect and the foregoing implementations, in some implementations of the second aspect, when the one or more programs are executed by the processor, the electronic device is enabled to perform the following step: when the at least one input end includes an input end connected to another electronic device, sending the first feedback command to a third electronic device, where the third electronic device is an electronic device connected to the first input end of the electronic device, and the first input end is one of the at least two input ends.

With reference to the second aspect and the foregoing implementations, in some implementations of the second aspect, the electronic device includes two output ends, and when the one or more programs are executed by the processor, the electronic device is enabled to perform the following step: sending a third control command to a fourth electronic device, where the third control command indicates that the electronic device and the fourth electronic device are in a same column, and indicates the position of the electronic device in the spliced electronic device, the fourth electronic device is an electronic device connected to a second output end of the electronic device, and the second output end is one of the two output ends other than the first output end.

With reference to the second aspect and the foregoing implementations, in some implementations of the second aspect, when the one or more programs are executed by the processor, the electronic device is enabled to perform the following step: receiving a second feedback command from the fourth electronic device, where the second feedback command indicates that the position of each electronic device in a same column as the fourth electronic device has been determined, and indicates the second quantity.

With reference to the second aspect and the foregoing implementations, in some implementations of the second aspect, the electronic device includes two input ends, and when the one or more programs are executed by the processor, the electronic device is enabled to perform the following step: sending the second feedback command to a fifth electronic device, where the fifth electronic device is an electronic device connected to the second input end of the electronic device, and the second input end is one of the at least two input ends other than the first input end.

With reference to the second aspect and the foregoing implementations, in some implementations of the second aspect, a first interface is deployed at each input end, and when the one or more programs are executed by the processor, the electronic device is enabled to perform the following step: if a high-level signal can be detected on the first interface, determining that an input end at which the first interface is deployed is connected to another electronic device.

With reference to the second aspect and the foregoing implementations, in some implementations of the second aspect, a second interface is deployed at each output end, and when the one or more programs are executed by the processor, the electronic device is enabled to perform the following step: if a high-level signal can be detected on the second interface, determining that an output end at which the second interface is deployed is connected to another electronic device.

According to a third aspect, this application provides an apparatus. The apparatus is included in an electronic device, and the apparatus has a function of implementing behavior of the electronic device in the foregoing aspects and the possible implementations of the foregoing aspects. The function may be implemented by hardware, or may be implemented by hardware executing corresponding software. The hardware or software includes one or more modules or units corresponding to the foregoing function.

According to a fourth aspect, this application provides an electronic device, including one or more processors, a memory, a plurality of applications, and one or more computer programs. The one or more computer programs are stored in the memory, and the one or more computer programs include a command. When the command is executed by the electronic device, the electronic device is enabled to perform the display method in any possible implementation of any one of the foregoing aspects.

According to a fifth aspect, this application provides an electronic device, including one or more processors and one or more memories. The one or more memories are coupled to the one or more processors. The one or more memories are configured to store computer program code, and the computer program code includes a computer command. When the one or more processors execute the computer command, the electronic device is enabled to perform the display method in any possible implementation of any one of the foregoing aspects.

According to a sixth aspect, this application provides a computer-readable storage medium, including a computer command. When the computer command is run on an electronic device, the electronic device is enabled to perform any possible display method according to any one of the foregoing aspects.

According to a seventh aspect, this application provides a computer program product. When the computer program product runs on an electronic device, the electronic device is enabled to perform any possible display method according to any one of the foregoing aspects.

DESCRIPTION OF EMBODIMENTS

The following describes technical solutions in embodiments of this application with reference to accompanying drawings in embodiments of this application.

Figure 1:
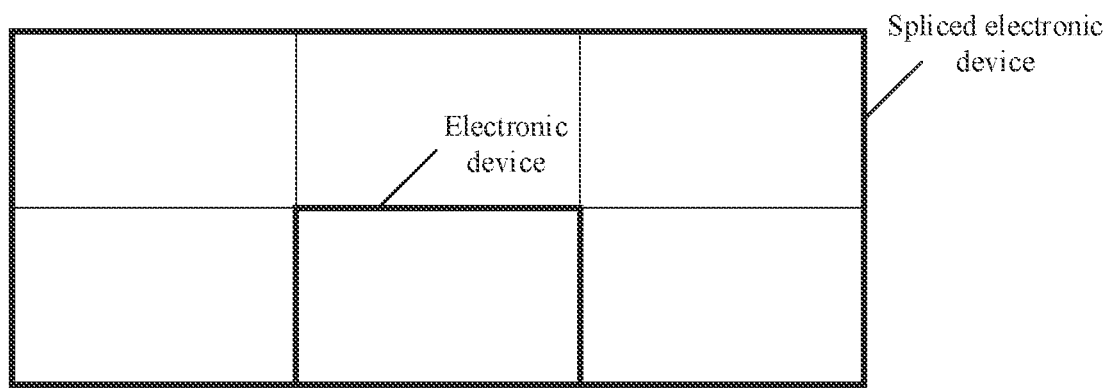
FIG. 1 is a schematic diagram of assembling a spliced electronic device according to an embodiment of this application.

In some display scenarios, for example, a home display scenario, to achieve a better visual effect, a user may splice a plurality of electronic devices having a display function into one electronic device having a relatively large display area FIG. 1 shows an example of a schematic diagram of assembling a spliced electronic device with six electronic devices having a display function (hereinafter referred to as "electronic devices"). A final picture viewed by the user is jointly displayed by the six electronic devices. In other words, each electronic device is responsible for displaying a part of an entire picture. In this case, if an electronic device does not know its position in the entire spliced electronic device, display disorder may occur in the final picture, which greatly affects viewing experience of the user.

In a solution, a spliced electronic device displays a picture, an image capture module collects picture data, an analysis module analyzes the data to determine a position of each electronic device in the spliced electronic device, and finally each electronic device determines, according to its position in the spliced electronic device, content that should be displayed, thereby avoiding display disorder.

It can be learned that the foregoing solution requires participation of an image capture module and an analysis module, and consequently, both complexity and costs are high.

In view of this, an embodiment of this application provides a display method. An electronic device determines its position in a spliced electronic device, and, based on the position, determines content that should be displayed, to avoid display disorder. In addition, the electronic device can determine its position in the spliced electronic device based only on a connection status of an input end, or based on both a connection status of an input end and a control command from another electronic device, where the control command indicates a position of the another electronic device in the spliced electronic device. Neither manual intervention nor participation of another device is required. In comparison, the display method provided in this embodiment of this application has relatively low complexity and costs while avoiding display disorder.

Before the display method provided in the embodiments of this application is described, an electronic device provided in this application is first described.

Figure 2:
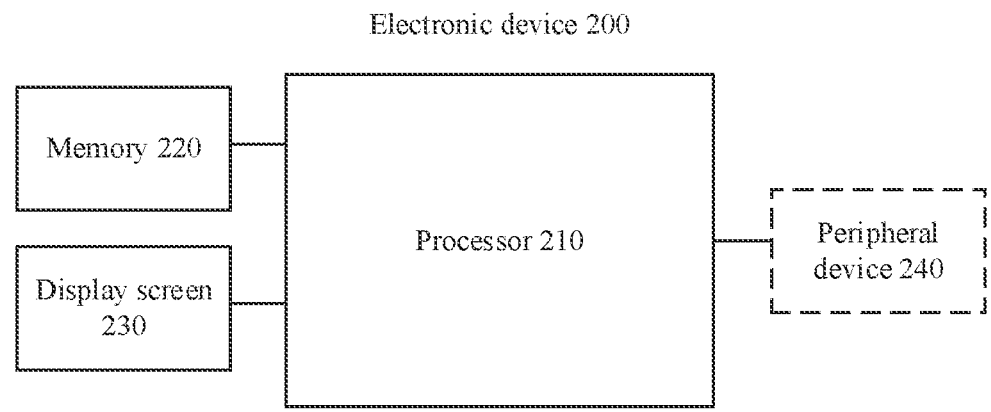
FIG. 2 is a schematic block diagram of an electronic device according to an embodiment of this application.

For example, FIG. 2 is a schematic diagram depicting a structure of an electronic device 200 according to an embodiment of this application. The electronic device 200 may be a client or a server, and the electronic device 200 may include a processor 210, a memory 220, a display screen 230, and the like.

The processor 210 may include one or more processing units. The memory 220 is configured to store program code and data. In this embodiment of this application, the processor 210 may execute a computer-executable command stored in the memory 220, to control and manage an action of the electronic device 200.

In addition, the electronic device 200 may further include the following ports (not shown in FIG. 2).

Video signal receiving port, which is used to receive a video signal.

Video signal sending port, which is used to send a video signal, where the video signal receiving port and the video signal sending port each may be, for example, a high-definition multimedia port (high definition multimedia interface, HDMI).

Control signal transmission port, which is used to transmit a control command. The control signal transmission port may be, for example, a universal serial bus (inter-integrated circuit, I2C) port, an RS485 port, or a network cable port. It should be noted that if the electronic device 200 sends a control command to another electronic device through the RS485 port or the network cable port, the electronic device 200 may also receive a feedback command for the control command from the another electronic device through the RS485 port or the network cable port; and if the electronic device 200 sends a control command to another electronic device through the I2C port, the electronic device 200 needs to obtain a feedback command for the control command from the another electronic device in a periodic query manner. For details about the control command and the feedback command for the control command in this embodiment of this application, refer to the following descriptions.

Detection port, which is used by the electronic device 200 to determine whether another electronic device is connected to the electronic device 200. For example, the detection port may specifically include a pin. If the electronic device 200 detects a high-level signal at the pin, it may be determined that the electronic device 200 is connected to another electronic device.

In specific implementation, the detection port may be integrated with the RS485 port or the detection port may be integrated with the I2C port. In other words, the electronic device 200 can transmit a control signal through an integrated interface, and can also determine a connection status of another electronic device through the integrated interface.

It should be noted that if the control signal transmission port is a network cable port, the electronic device 200 may directly determine, by using the network cable port, whether another electronic device is connected to the electronic device 200. For example, if the electronic device 200 detects a high-level signal at a network port, it may be determined that the electronic device 200 is connected to another electronic device.

Optionally, the electronic device 200 may further include a peripheral device 240, for example, a mouse, a keyboard, a speaker, and a microphone.

It should be understood that, in addition to the various components or modules listed in FIG. 2, a structure of the electronic device 200 is not specifically limited in this embodiment of this application. In some other embodiments of this application, the electronic device 200 may further include more or fewer components than those shown in the figure, or may combine some components, or may split some components, or may have different component arrangements. The components shown in the figure may be implemented by hardware, software, or a combination of software and hardware.

Figure 3:
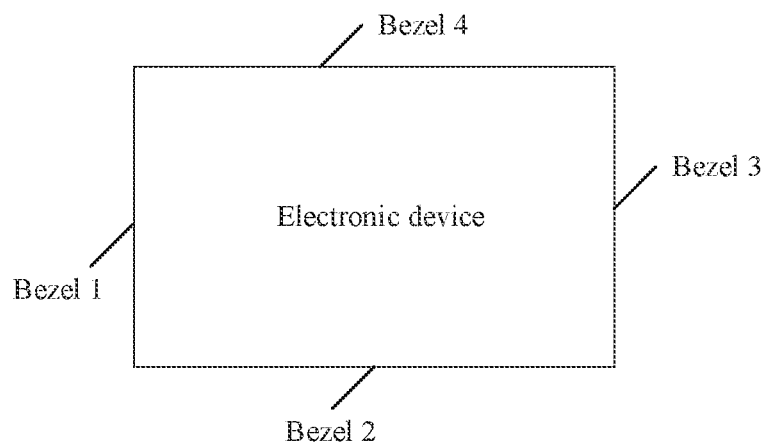
FIG. 3 is a schematic diagram of bezels of an electronic device according to an embodiment of this application.

With reference to the scenario shown in FIG. 1, the following describes in detail the display method provided in the embodiments of this application by using an example in which the electronic device in FIG. 1 is a display screen. The display screen usually has four bezels, and the four bezels are respectively denoted as a bezel 1, a bezel 2, a bezel 3, and a bezel 4, as shown in FIG. 3. The bezel 1 and the bezel 2 are defined as input ends of the display screen. In other words, the ports having a receiving function are deployed on the bezel 1 and the bezel 2. The bezel 3 and the bezel 4 are defined as output ends of the display screen. In other words, the ports having a sending function are deployed on the bezel 3 and the bezel 4. In the following description, it is assumed that HDMI and RS485 receiving ports are deployed on both the bezel 1 and the bezel 2, and it is assumed that HDMI and RS485 sending ports are deployed on both the bezel 3 and the bezel 4.

In addition, one detection interface may be deployed on each of the bezel 1, the bezel 2, the bezel 3, and the bezel 4 of the display screen. For ease of description, the detection interface deployed on the bezel 1 is referred to as an interface 1, the detection interface deployed on the bezel 2 referred to as an interface 2, the detection interface deployed on the bezel 3 referred to as an interface 3, and the detection interface deployed on the bezel 4 referred to as an interface 4. If an input end on the bezel 1 of the display screen is connected to another display screen, the display screen may detect a high-level signal at the interface 1. If an output end on the bezel 3 of the display screen is connected to another display screen, the display screen may detect a high-level signal at the interface 3. Therefore, the display screen may detect whether a high-level signal exists at each interface, to determine whether the display screen is connected to another display screen.

For the six display screens in FIG. 1, when the six display screens are powered on for the first time or receive a command for determining their positions, the six display screens determine their respective positions in the spliced display screen. The following describes, respectively from perspectives of different display screens in FIG. 1, the display method provided in the embodiments of this application.

For ease of description, starting from the display screen in the first row and the first column from bottom to top in FIG. 1, the six display screens are sequentially denoted in a counterclockwise direction as a display screen 1, a display screen 2, a display screen 3, a display screen 4, a display screen 5, and a display screen 6.

Figure 4A:
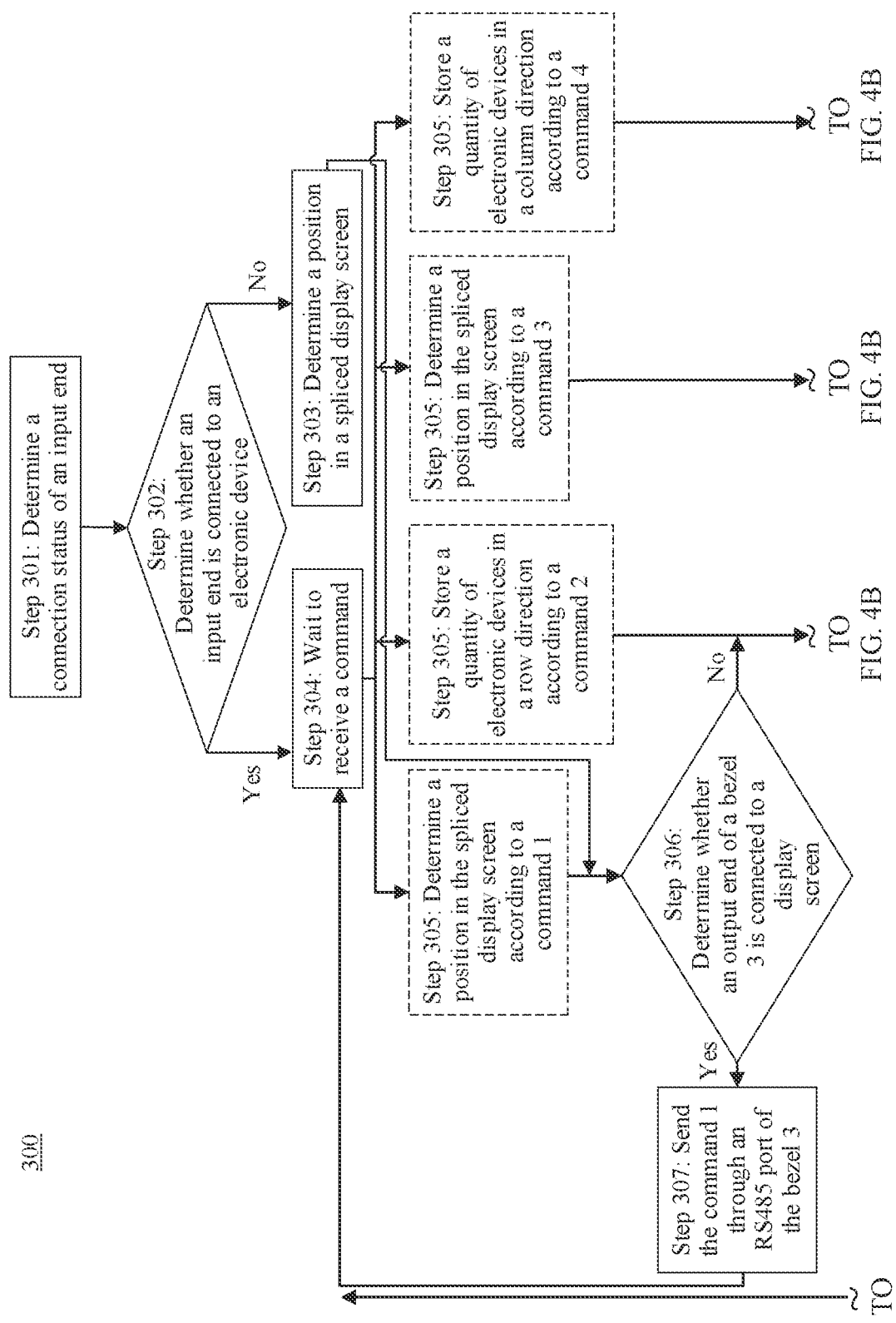
FIG. 4A and FIG. 4B are an example of a schematic flowchart of a display method according to an embodiment of this application.
Figure 4B:
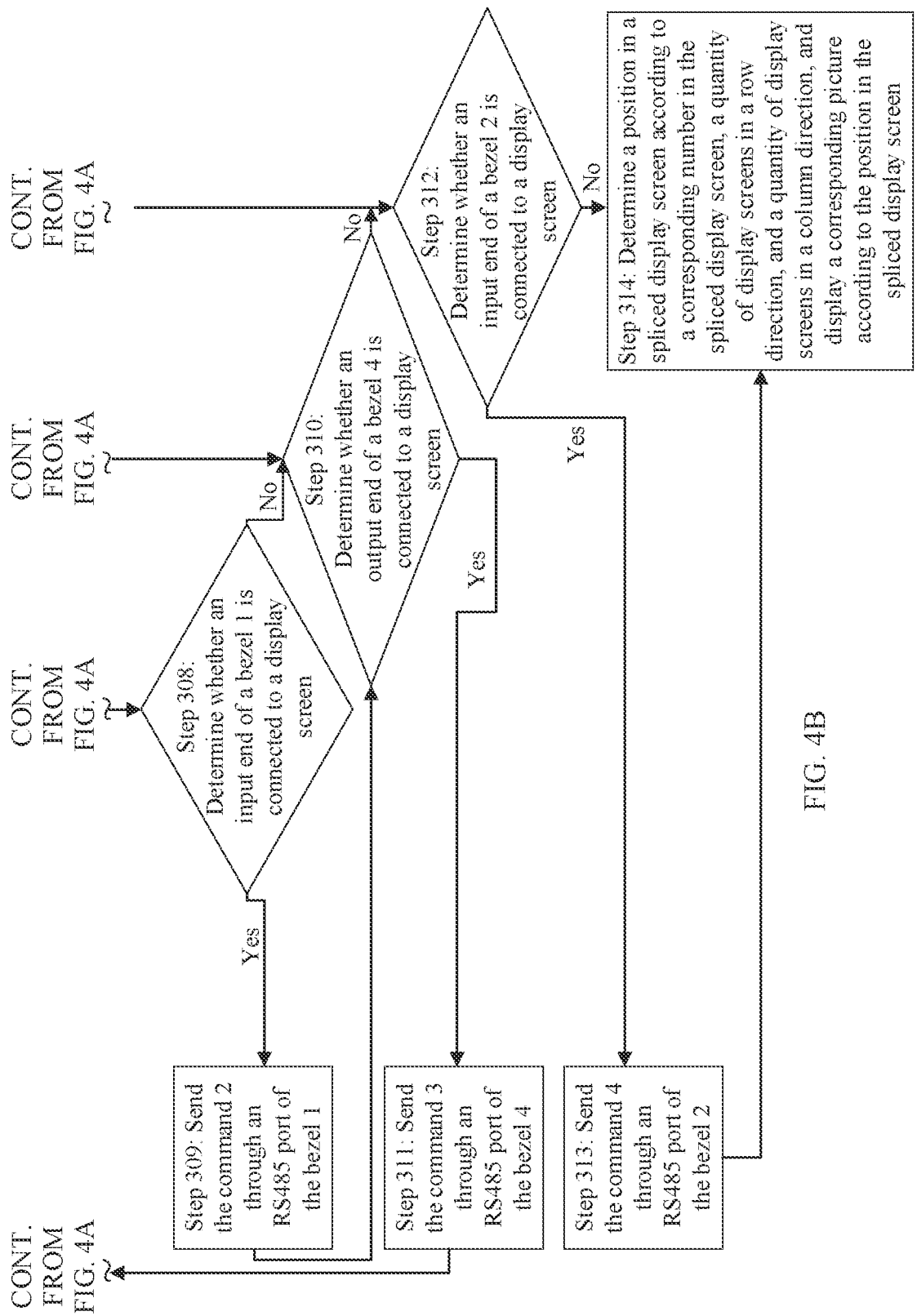

First, the display screen 1 is used as an example to describe an embodiment of a display method 300 provided in an embodiment of this application. FIG. 4A and FIG. 4B are a schematic flowchart of the display method 300. First, the following agreement is made in this embodiment: In FIG. 1, after the display screen 1 determines its position in the spliced display screen according to the display method 300, the display screen 1 communicates rightward, so that the display screen 2 and the display screen 3 sequentially determine their respective positions in the spliced display device according to the display method 300, and then the display screens in the first row sequentially communicate upward, so that the display screens in each column sequentially determine their respective positions in the spliced display screen according to the display method 300.

Step 301: Determine a connection status of an input end.

For example, the display screen 1 may detect the port 1 and the port 2, so as to determine whether the input end of the display screen 1 is connected to a display screen.

It can be learned from FIG. 1 that neither the bezel 1 nor the bezel 2 of the display screen 1 is spliced with any display screen. Therefore, the display screen 1 can detect a high-level signal at neither the port 1 nor the port 2, and the display screen 1 may determine that the input end is not connected to any display screen.

Step 302: Determine whether the input end is connected to a display screen.

If the display screen 1 determines that the input end is not connected to a display screen, step 303 is performed; or if the display screen 1 determines that the input end is connected to a display screen, step 304 is performed. It can be learned from the description in step 301 that the input end of the display screen 1 is not connected to any display screen. Therefore, the display screen 1 performs step 303.

Step 303: Determine a position in the spliced display screen.

When the display screen 1 determines that the input end is not connected to any display screen, the display screen 1 may determine that the display screen 1 is in the first row and the first column in the spliced display screen.

Step 304: Wait to receive a command.

In step 304, the display screen 1 receives one of the following four types of commands:

Command 1: A format of the command 1 is "field 1+field 2", where the field 1 represents that a type of the command 1 is a row direction command, and the field 2 represents a position of a display screen sending the command 1 in the spliced display screen. It should be noted that when the type of the command is a row direction command, it represents that the display screen sending the command and the display screen receiving the command are in a same row.

Command 2: A format of the command 2 is "field 1+field 2+field 3", where the field 1 represents that a type of the command 2 is a row direction feedback command, the field 2 represents that the position of each display screen in the row direction has been determined, and the field 3 represents a quantity of display screens in the row direction.

Command 3: A format of the command 3 is "field 1+field 2", where the field 1 represents that a type of the command 3 is a column direction command, and the field 2 represents a position of a display screen sending the command 3 in the spliced display screen. It should be noted that when the type of the command is a column direction command, it indicates that the display screen sending the command and the display screen receiving the command are in a same column.

Command 4: A format of the command 4 is "field 1+field 2+field 3", where the field 1 represents that a type of the command 4 is a column direction feedback command, the field 2 represents that the position of each display screen in the column direction has been determined, and the field 3 represents a quantity of display screens in the column direction.

The display screen 1 performs step 305 after step 304. Because there are four types of commands in step 304, step 305 also includes four cases corresponding to the four types of commands. The display screen 1 will select, according to the received one of the four types of commands, step 305 corresponding to one of the following cases for execution:

Case 1: If the display screen 1 receives the command 1, step 305 is: The display screen 1 determines the position of the display screen 1 in the spliced display screen according to the command 1.

Case 2: If the display screen 1 receives the command 2, step 305 is: The display screen 1 records the quantity of display screens in the row direction according to the command 2.

Case 3: If the display screen 1 receives the command 3, step 305 is: The display screen 1 determines the position of the display screen 1 in the spliced display screen according to the command 3.

Case 4: If the display screen 1 receives the command 4, step 305 is: The display screen 1 records the quantity of display screens in the column direction according to the command 4.

Step 306: Determine whether an output end of the bezel 3 is connected to a display screen.

The display screen 1 may perform step 306 after step 303. If the output end of the bezel 3 is connected to a display screen, step 307 is performed; or if the output end of the bezel 3 is not connected to a display screen, step 308 is performed. Step 308 is: Determine whether an input end of the bezel 1 is connected to a display screen. It can be learned from FIG. 1 that the bezel 3 of the display screen 1 is spliced with the bezel 1 of the display screen 2. Therefore, the display screen 1 detects a high-level signal at the port 3, and the display screen 1 may determine that the output end of the bezel 3 of the display screen 1 is connected to a display screen. Therefore, the display screen 1 performs step 307.

Step 307: Send the command 1 through an RS485 port of the bezel 3.

After determining that the output end of the bezel 3 is connected to a display screen, the display screen 1 may send the command 1 to the display screen 2 through the RS485 port of the bezel 3. The display screen 2 determines, according to the field 1 in the command 1, that the display screen 2 is in the same row as the display screen 1: and then determines, with reference to the field 2, that the display screen 2 is in the first row and the second column in the spliced display screen.

It can be learned, based on the agreement made at the beginning of this embodiment, that then the display screen 2 may determine whether the output end of the bezel 3 of the display screen 2 is connected to a display screen. It can be learned from FIG. 1 that the bezel 3 of the display screen 2 is spliced with the bezel 1 of the display screen 3. Therefore, the display screen 2 may send the command 1 to the display screen 3 through the RS485 port of the bezel 3. The display screen 3 determines, according to the field 1 in the command 1, that the display screen 3 is in the same row as the display screen 2; and then determines, with reference to the field 2, that the terminal is in the first row and the third column in the spliced display screen.

Then the display screen 3 may determine whether the output end of the bezel 3 of the display screen 3 is connected to a display screen. It can be learned from FIG. 1 that the bezel 3 of the display screen 3 is not spliced with another display screen. Therefore, the display screen 3 may determine that the position of each display screen in the same row as the display screen 3 has been determined, and may determine that the quantity of display screens in the same row as the display screen 3 is 3.

Then the display screen 3 may determine whether the input end of the bezel 1 of the display screen 3 is connected to a display screen. It can be learned from FIG. 1 that the bezel 1 of the display screen 3 is spliced with the bezel 3 of the display screen 2. Therefore, the display screen 3 may send the command 2 to the display screen 2 through the RS485 port of the bezel 1. The display screen 2 determines, according to the field 1 in the command 2, that the display screen 2 is in a same row with the display screen 3; determines, with reference to the field 2, that the position of each display screen in the same row as the display screen 2 has been determined; and then determines, with reference to the field 3, that the quantity of display screens in the same row as the display screen 2 is 3. The display screen 2 may record that the quantity of display screens in the same row as the display screen 2 is 3.

Then the display screen 2 may determine whether the input end of the bezel 1 of the display screen 2 is connected to a display screen. It can be learned from FIG. 1 that the bezel 1 of the display screen 2 is spliced with the bezel 3 of the display screen 1. Therefore, the display screen 2 may send the command 2 to the display screen 1 through the RS485 port of the bezel 1.

After performing step 307, the display screen 1 performs step 304, that is, wait to receive a command. It can be learned from the foregoing description that the display screen 1 receives the command 2 from the display screen 2 in step 304. Therefore, for the four cases in step 305, the display screen 1 performs step 305 corresponding to the case 2. That is, the display screen 1 records the quantity of display screens in the row direction. After performing step 305 corresponding to the case 2, the display screen 1 may perform step 308, that is, determine whether the input end of the bezel 1 is connected to a display screen.

If the input end of the bezel 1 is connected to a display screen, step 309 is performed; or if the input end of the bezel 1 is not connected to a display screen, step 310 is performed. Step 309 is: Send the command 2 through an RS485 port of the bezel 1. It can be learned from FIG. 1 that the input end of the bezel 1 of the display screen 1 is not connected to a display screen. Therefore, the display screen 1 performs step 310.

Step 310: Determine whether an output end of the bezel 4 is connected to a display screen.

If the output end of the bezel 4 is connected to a display screen, step 311 is performed; or if the output end of the bezel 4 is not connected to a display screen, step 312 is performed. It can be learned from FIG. 1 that the output end of the bezel 4 of the display screen 1 is connected to a display screen. Therefore, the display screen 1 performs step 311.

Step 311: Send the command 3 through an RS485 port of the bezel 4.

After determining that the output end of the bezel 4 is connected to a display screen, the display screen 1 may send the command 3 to the display screen through the RS485 port of the bezel 4. It can be learned from FIG. 1 that the display screen 1 is spliced with the display screen 6. Therefore, the display screen 1 may send the command 3 to the display screen 6 through the RS485 port of the bezel 4. The display screen 6 determines, according to the field 1 in the command 3, that the display screen 6 is in the same column as the display screen 1; determines, with reference to the field 2, that the display screen 6 is in the second row and the first column in the spliced display screen; and then determines, according to the field 3, that the quantity of display screens in the row direction is 3.

It can be learned, based on the agreement made at the beginning of this embodiment, that then the display screen 6 may determine whether the output end of the bezel 4 of the display screen 6 is connected to a display screen. It can be learned from FIG. 1 that the bezel 4 of the display screen 6 is not spliced with another display screen. Therefore, the display screen 6 may determine that the position of each display screen in the same column as the display screen 6 has been determined, and may determine that the quantity of display screens in the same column as the display screen 6 is 2.

Then the display screen 6 may determine whether the input end of the bezel 2 of the display screen 6 is connected to a display screen. It can be learned from FIG. 1 that the bezel 2 of the display screen 6 is spliced with the bezel 4 of the display screen 1. In this case, the display screen 6 may send the command 4 to the display screen 1 through the RS485 port of the bezel 2.

After performing step 311, the display screen 1 performs step 304, that is, waits to receive a command. It can be learned from the foregoing description that the display screen 1 receives the command 4 from the display screen 6. In other words, in step 305, the display screen 1 performs step 305 corresponding to the case 4. That is, the display screen 1 records the quantity of display screens in the column direction. After performing step 305 corresponding to the case 4, the display screen 1 may perform step 312.

Step 312 is: Determine whether the input end of the bezel 2 is connected to a display screen.

If the input end of the bezel 2 is connected to a display screen, step 313 is performed; or if the input end of the bezel 2 is not connected to a display screen, step 314 is performed. Step 313 is: Send the command 4 through an RS485 port of the bezel 2. It can be learned from FIG. 1 that the input end of the bezel 2 of the display screen 1 is not connected to a display screen. Therefore, the display screen 1 performs step 314.

Step 314: Display a corresponding image according to a position in the spliced display screen, the quantity of display screens in the row direction, and the quantity of display screens in the column direction.

The display screen 1 may determine, according to the recorded quantity 3 of display screens in the row direction and the recorded quantity 3 of display screens in the column direction, that the display screen 1 displays one third of the entire picture in both the row direction and the column direction. In addition, because the display screen 1 is in the first row and the first column in the spliced display screen, the display screen 1 can locate, in the entire picture, specific content of the one third of the picture that should be actually displayed, and finally display the determined one third of the picture.

The following uses the display screen 3 as an example to describe another embodiment of the display method 300 provided in the embodiments of this application. First, the following agreement is made in this embodiment: In FIG. 1, after each of the display screens in the first row and the first column from bottom to top determines, according to the display method 300, the position of the display screen in the spliced display screen, other display screens in the first row sequentially communicate rightward, so that other display screens in the first row sequentially determine, according to the display method 300, the positions of the display screens in the spliced display device, and then the display screens in the first row sequentially communicate upward, so that the display screens in each column sequentially determine, according to the display method 300, the positions of the display screens in the spliced display screen.

Step 301: Determine a connection status of an input end.

For example, the display screen 3 may detect the port 1 and the port 2, to determine that the input end of the display screen 3 is connected to a display screen.

It can be learned from FIG. 1 that the bezel 1 of the display screen 3 is spliced with the bezel 3 of the display screen 2. Therefore, the display screen 3 can detect a high-level signal on the port 1. Therefore, the display screen 3 may determine that the input end of the bezel 1 is connected to a display screen.

Step 302: Determine whether the input end is connected to a display screen.

If the display screen 3 determines that the input end is not connected to a display screen, step 303 is performed; or if the display screen 3 determines that the input end is connected to a display screen, step 304 is performed. Step 303 is: Determine a position in the spliced display screen. For example, if the display screen 3 determines that the input end is not connected to any display screen, the display screen 3 may determine that the display screen 3 is in the first row and the first column in the spliced display screen.

It can be learned from the description in step 301 that the input end of the bezel 1 of the display screen 3 is connected to a display screen. Therefore, the display screen 3 performs step 304.

Step 304: Wait to receive a command.

In step 304, the display screen 1 receives one of the following four types of commands:

Command 1: A format of the command 1 is "field 1+field 2", where the field 1 represents that a type of the command 1 is a row direction command, and the field 2 represents a position of a display screen sending the command 1 in the spliced display screen. It should be noted that when the type of the command is a row direction command, it represents that the display screen sending the command and the display screen receiving the command are in a same row.

Command 2: A format of the command 2 is "field 1+field 2+field 3", where the field 1 represents that a type of the command 2 is a row direction feedback command, the field 2 represents that the position of each display screen in the row direction has been determined, and the field 3 represents a quantity of display screens in the row direction.

Command 3: A format of the command 3 is "field 1+field 2", where the field 1 represents that a type of the command 3 is a column direction command, and the field 2 represents a position of a display screen sending the command 1 in the spliced display screen. It should be noted that when the type of the command is a column direction command, it indicates that the display screen sending the command and the display screen receiving the command are in a same column.

Command 4: A format of the command 4 is "field 1+field 2+field 3", where the field 1 represents that a type of the command 4 is a column direction feedback command, the field 2 represents that the position of each display screen in the column direction has been determined, and the field 3 represents a quantity of display screens in the column direction.

The display screen 3 performs step 305 after step 304. Because there are four types of commands in step 304, step 305 also includes four cases corresponding to the four types of commands. The display screen 3 will select, according to the received one of the four types of commands, step 305 corresponding to one of the following cases for execution:

Case 1: If the display screen 3 receives the command 1, step 305 is: The display screen 3 determines the position of the display screen 3 in the spliced display screen according to the command 1.

Case 2: If the display screen 3 receives the command 2, step 305 is: The display screen 3 records the quantity of display screens in the row direction according to the command 2.

Case 3: If the display screen 3 receives the command 3, step 305 is: The display screen 3 determines the position of the display screen 3 in the spliced display screen according to the command 3.

Case 4: If the display screen 3 receives the command 4, step 305 is: The display screen 3 records the quantity of display screens in the column direction according to the command 4.

It can be learned, based on the agreement made at the beginning of this embodiment, that the display screen 3 receives the command 1 from the display screen 2 in step 304. Therefore, for the four cases in step 305, the display screen 3 performs step 305 corresponding to the case 1. That is, the display screen 3 determines, according to the field 1 in the command 1 from the display screen, that the display screen 3 is in the same row as the display screen 2: and then determines, with reference to the field 2, that the display screen 3 is in the first row and the third column in the spliced display screen. After performing step 305 corresponding to the case 2, the display screen 3 may perform step 306, that is, determine whether the output end of the bezel 3 is connected to a display screen.

If the output end of the bezel 3 is connected to a display screen, step 307 is performed; or if the output end of the bezel 3 is not connected to a display screen, step 308 is performed. Step 307 is: Send a command 1 through an RS485 port of the bezel 3. It can be learned from FIG. 1 that the output end of the bezel 3 of the display screen 3 is not connected to a display screen. Therefore, the display screen 3 performs step 308. It should be noted that when the display screen 3 determines that the output end of the bezel 3 is not connected to a display screen, the display screen 3 may determine that the position of each display screen in the row direction has been determined, and may determine that the quantity of display screens in the row direction is 3, and the display screen 3 may record the quantity of display screens in the row direction.

Step 308: Determine whether the input end of the bezel 1 is connected to a display screen.

If the input end of the bezel 1 is connected to a display screen, step 309 is performed; or if the input end of the bezel 1 is not connected to a display screen, step 310 is performed. Step 309 is: Send a command 2 through an RS485 port of the bezel 1. It can be learned from FIG. 1 that the input end of the bezel 1 of the display screen 3 is connected to a display screen. Therefore, the display screen 3 performs step 309.

Step 309: Send the command 2 through an RS485 port of the bezel 1.

When the display screen 3 determines that the input end of the bezel 1 is connected to a display screen, the display screen 3 may send the command 2 to the display screen. It can be learned from FIG. 1 that the bezel 1 of the display screen 3 is spliced with the display screen 2. Therefore, the display screen 3 may send the command 2 to the display screen 2 through the RS485 port of the bezel 1. The display screen 2 determines, according to the field 1 in the command 2, that the display screen 2 is in a same row as the display screen 1; determines, with reference to the field 2, that the position of each display screen in the row direction has been determined; and then determines, with reference to the field 3, that the quantity of display screens in the row direction is 3. The display screen 2 may store the quantity of display screens in the row direction.

After performing step 309, the display screen 3 may perform step 310.

Step 310: Determine whether an output end of the bezel 4 is connected to a display screen.

If the output end of the bezel 4 is connected to a display screen, step 311 is performed; or if the output end of the bezel 4 is not connected to a display screen, step 312 is performed. Step 312 is: Determine whether the input end of the bezel 2 is connected to a display screen. It can be learned from FIG. 1 that the output end of the bezel 4 of the display screen 3 is connected to a display screen. Therefore, the display screen 3 performs step 311.

Step 311: Send the command 3 through an RS485 port of the bezel 4.

When the display screen 3 determines that the output end of the bezel 4 is connected to a display screen, the display screen 3 may send the command 3 to the display screen. It can be learned from FIG. 1 that the bezel 4 of the display screen 3 is spliced with the display screen 4. Therefore, the display screen 3 may send the command 3 to the display screen 4 through the RS485 port of the bezel 4. The display screen 4 determines, according to the field 1 in the command 3, that the display screen 4 is in the same column as the display screen 3; and determines, according to the field 2, that the display screen 4 is in the second row and the third column in the spliced display screen.

After performing step 311, the display screen 3 performs step 304, that is, waits to receive a command. Based on the agreement made at the beginning of this embodiment, the display screen 3 receives the command 4 from the display screen 4 in step 304. Therefore, for the four cases in step 305, the display screen 3 performs step 305 corresponding to the case 4. That is, the display screen 3 records the quantity of display screens in the column direction. After performing step 305 corresponding to the case 4, the display screen 3 may perform step 312, that is, determine whether the input end of the bezel 2 is connected to a display screen.

If the input end of the bezel 2 is connected to a display screen, step 313 is performed; or if the input end of the bezel 2 is not connected to a display screen, step 314 is performed. Step 313 is: Send a command 4 through an RS485 port of the bezel 2. It can be learned from FIG. 1 that the input end of the bezel 2 of the display screen 3 is not connected to a display screen. Therefore, the display screen 3 performs step 314.

Step 314: Display a corresponding picture according to a position in the spliced display screen, the quantity of display screens in the row direction, and the quantity of display screens in the column direction.

The display screen 3 may determine, according to the recorded quantity 3 of display screens in the row direction and the recorded quantity 3 of display screens in the column direction, that the display screen 3 displays one third of the entire picture in both the row direction and the column direction. In addition, because the display screen 3 is in the first row and the third column in the spliced display screen, the display screen 3 can locate, in the entire picture, specific content of the one third of the picture that should be actually displayed, and finally display the determined one third of the picture.

Figure 5A:
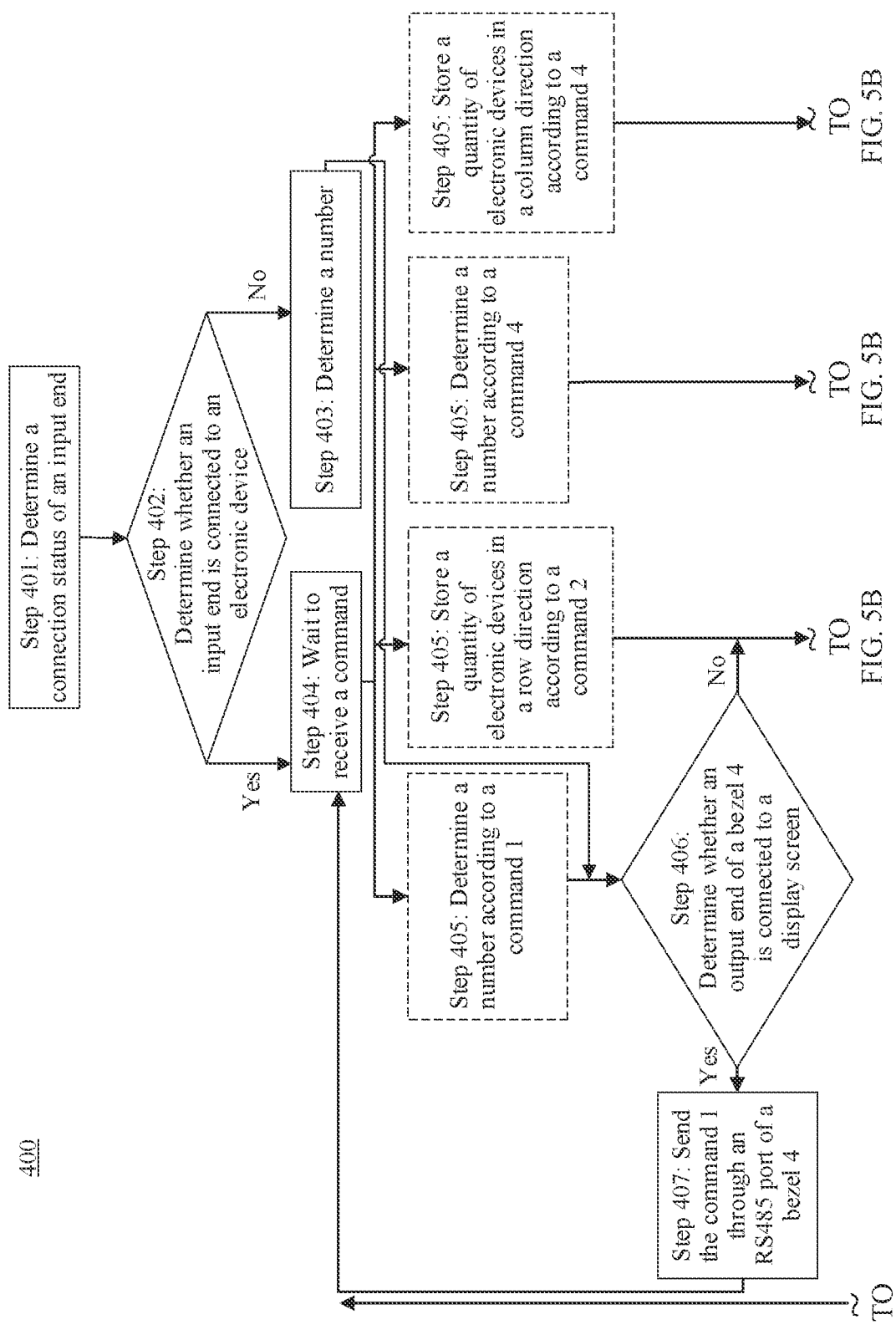
FIG. 5A and FIG. 5B are another example of a schematic flowchart of a display method according to an embodiment of this application.
Figure 5B:
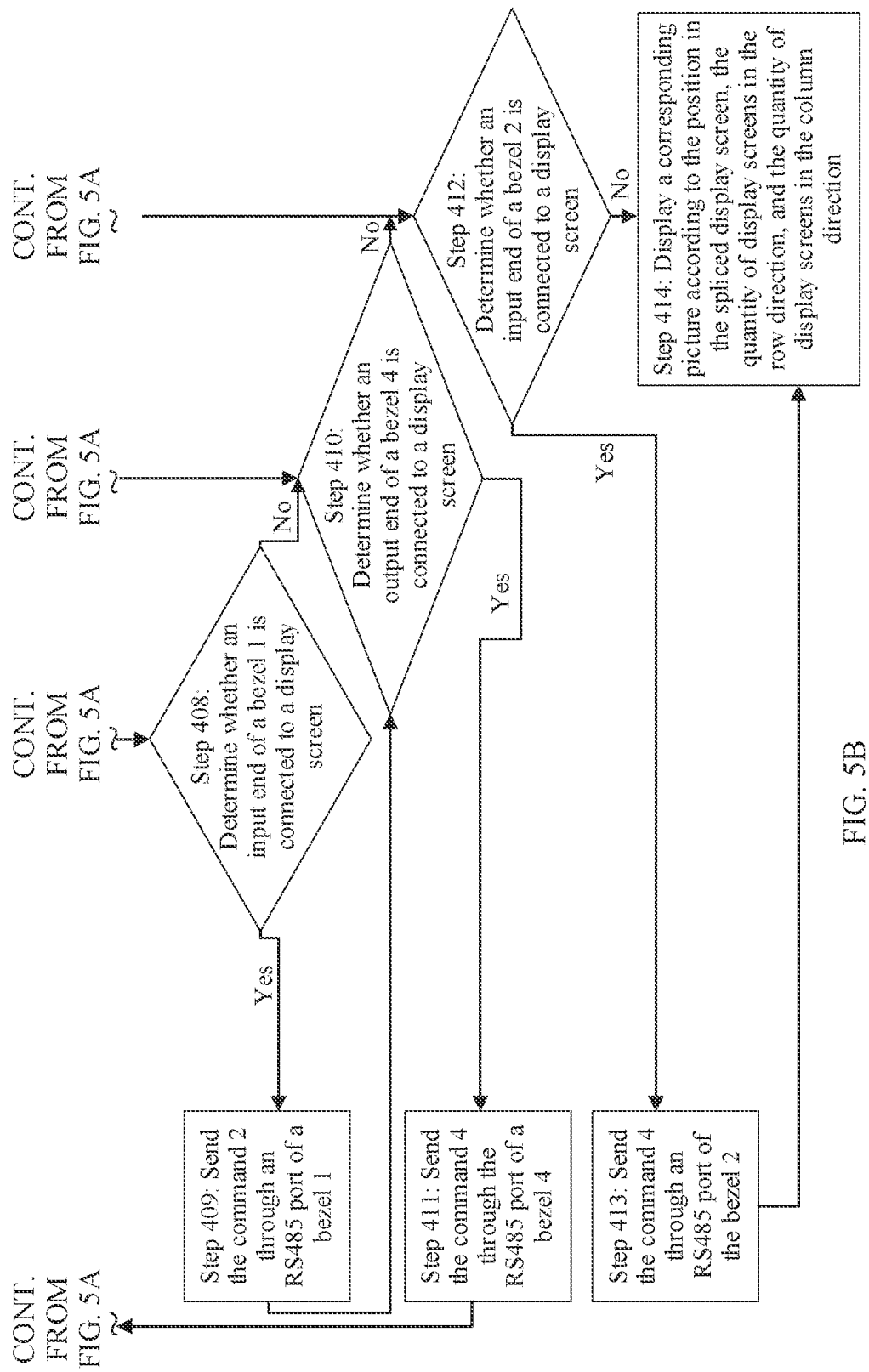

The following uses the display screen 1 as an example to describe an embodiment of a display method 400 according to an embodiment of this application. FIG. 5A and FIG. 5B are a schematic flowchart of the display method 400. In this embodiment, when determining the position of the display screen in the spliced display screen, the display screen may first generate an identifier, and finally determine, according to the identifier, the quantity of display screens in the row direction, and the quantity of electronic devices in the column direction, the position of the display screen in the spliced display screen. For example, the identifier may be a number, and the following rule may be followed when the number is generated: For example, for the six display screens in FIG. 1, numbers generated by the display screens in the first row from bottom to top are sequentially 1, 2, and 3 from left to right, and numbers generated by the display screens in the second row are sequentially 4, 5, and 6 from left to right. In addition, the following agreement is made in this embodiment: In FIG. 1, after each of the display screens in the first row and the first column from bottom to top determines, according to the display method 400, the number of the display screen, other display screens in the first row sequentially communicate rightward, so that other display screens in the first row sequentially determine, according to the display method 400, the numbers of the display screens, and then the display screens in the first row sequentially communicate upward, so that the display screens in each column sequentially determine, according to the display method 400, the numbers of the display screens.

Step 401: Determine a connection status of an input end.

For example, the display screen 1 may detect the port 1 and the port 2, to determine that the input end of the display screen 1 is connected to a display screen.

It can be learned from FIG. 1 that neither the bezel 1 nor the bezel 2 of the display screen 1 is spliced with any display screen. Therefore, the display screen 1 can detect a high-level signal at neither the port 1 nor the port 2, and the display screen 1 may determine that the input end is not connected to any display screen.

Step 402: Determine whether the input end is connected to a display screen.

If the display screen 1 determines that the input end is not connected to a display screen, step 403 is performed; or if the display screen 1 determines that the input end is connected to a display screen, step 404 is performed. It can be learned from the description in step 401 that the input end of the display screen 1 is not connected to any display screen. Therefore, the display screen 1 performs step 403.

Step 403: Determine a number.

When the display screen 1 determines that the input end is not connected to any display screen, the display screen 1 may determine that the number of the display screen 1 is 1.

Step 404: Wait to receive a command.

In step 404, the display screen 1 receives one of the following four types of commands:

Command 1: A format of the command 1 is "field 1+field 2", where the field 1 represents that a type of the command 1 is a row direction command, and the field 2 represents a number of a display screen sending the command 1. It should be noted that when the type of the command is a row direction command, it represents that the display screen sending the command and the display screen receiving the command are in a same row.

Command 2: A format of the command 1 is "field 1+field 2+field 3", where the field 1 represents that a type of the command 2 is a row direction feedback command, the field 2 represents that the number of each display screen in the row direction has been determined, and the field 3 represents a quantity of display screens in the row direction.

Command 3: A format of the command 3 is "field 1+field 2", where the field 1 represents that a type of the command 3 is a column direction command, and the field 2 represents a number of a display screen sending the command 1 in the spliced display screen. It should be noted that when the type of the command is a column direction command, it indicates that the display screen sending the command and the display screen receiving the command are in a same column.

Command 4: A format of the command 4 is "field 1+field 2+field 3", where the field 1 represents that a type of the command 4 is a column direction feedback command, the field 2 represents that the number of each display screen in the column direction has been determined, and the field 3 represents a quantity of display screens in the column direction.

The display screen 1 performs step 405 after step 404. Because there are four types of commands in step 404, step 405 also includes four cases corresponding to the four types of commands. The display screen 1 will select, according to the received one of the four types of commands, step 405 corresponding to one of the following cases for execution:

Case 1: If the display screen 1 receives the command 1, step 405 is: The display screen 1 determines the number of the display screen 1 according to the command 1.

Case 2: If the display screen 1 receives the command 2, step 405 is: The display screen 1 records the quantity of display screens in the row direction according to the command 2.

Case 3: If the display screen 1 receives the command 3, step 405 is: The display screen 1 determines the number of the display screen 1 according to the command 3. For a specific method, refer to related descriptions below.

Case 4: If the display screen 1 receives the command 4, step 405 is: The display screen 1 records the quantity of display screens in the column direction according to the command 4.

Step 406: Determine whether an output end of the bezel 3 is connected to a display screen.

After step 403, the display screen 1 may perform step 406, that is, determine whether the output end of the bezel 3 is connected to a display screen. If the output end of the bezel 3 is connected to a display screen, step 407 is performed; or if the output end of the bezel 3 is connected to a display screen, step 408 is performed. Step 408 is: Determine whether an input end of the bezel 1 is connected to a display screen. It can be learned from FIG. 1 that the output end of the bezel 3 of the display screen 1 is connected to a display screen. Therefore, the display screen 1 performs step 407.

Step 407: Send the command 1 through an RS485 port of the bezel 3.

After determining that the output end of the bezel 3 is connected to a display screen, the display screen 1 may send the command 1 to the display screen through the RS485 port. It can be learned from FIG. 1 that the display screen 1 is spliced with the display screen 2. Therefore, the display screen 1 sends the command 1 to the display screen 2 through the RS485 port. The display screen 2 determines, according to the field 1 in the command 1, that the display screen 2 is in the same row as the display screen 1; and then determines, with reference to the field 2, that the number of the display screen 2 is the number of the display screen 1 plus 1. Therefore, the display screen 2 determines that the number of the display screen 2 is 2.

It can be learned, based on the agreement made at the beginning of this embodiment, that then the display screen 2 may determine whether an output end of the bezel 3 of the display screen 2 is connected to a display screen. It can be learned from FIG. 1 that the bezel 3 of the display screen 2 is spliced with the bezel 1 of the display screen 3. Therefore, the display screen 2 may send the command 1 to the display screen 3 through the RS485 port of the bezel 3. The display screen 3 determines, according to the field 1 in the command 1, that the display screen 3 is in the same row as the display screen 2; and then determines, with reference to the field 2, that the number of the display screen 3 is the number of the display screen 2 plus 1. Therefore, the display screen 3 determines that the number of the display screen 3 is 3.

Then the display screen 3 may determine whether the output end of the bezel 3 of the display screen 3 is connected to a display screen. It can be learned from FIG. 1 that the bezel 3 of the display screen 3 is not spliced with another display screen. Therefore, the display screen 3 may determine that the position of each display screen in the same row as the display screen 3 has been determined, and may determine that the quantity of display screens in the same row as the display screen 3 is 3.

Then the display screen 3 may determine whether the input end of the bezel 1 of the display screen 3 is connected to a display screen. It can be learned from FIG. 1 that the bezel 1 of the display screen 3 is spliced with the bezel 3 of the display screen 2. Therefore, the display screen 3 may send the command 2 to the display screen 2 through the RS485 port of the bezel 1. The display screen 2 determines, according to the field 1 in the command 2, that the display screen 2 is in a same row with the display screen 3; determines, with reference to the field 2, that the position of each display screen in the same row as the display screen 2 has been determined; and then determines, with reference to the field 3, that the quantity of display screens in the same row as the display screen 2 is 3. The display screen 2 may record that the quantity of display screens in the same row as the display screen 2 is 3.

Then the display screen 2 may determine whether the input end of the bezel 1 of the display screen 2 is connected to a display screen. It can be learned from FIG. 1 that the bezel 1 of the display screen 2 is spliced with the bezel 3 of the display screen 1. Therefore, the display screen 2 may send the command 2 to the display screen 1 through the RS485 port of the bezel 1.

After performing step 407, the display screen 1 performs step 404, that is, waits to receive a command. It can be learned from the foregoing description that the display screen 1 receives the command 2 from the display screen 2 in step 404. Therefore, for the four cases in step 405, the display screen 1 performs step 405 corresponding to the case 2. That is, the display screen 1 records the quantity of display screens in the row direction. After performing step 405 corresponding to the case 2, the display screen 1 may perform step 408, that is, determine whether the input end of the bezel 1 is connected to a display screen.

If the input end of the bezel 1 is connected to a display screen, step 409 is performed; or if the input end of the bezel 1 is not connected to a display screen, step 410 is performed. Step 409 is: Send a command 2 through an RS485 port of the bezel 1. It can be learned from FIG. 1 that the input end of the bezel 1 of the display screen 1 is not connected to a display screen. Therefore, the display screen 1 performs step 410.

Step 410: Determine whether an output end of the bezel 4 is connected to a display screen.

If the output end of the bezel 4 is connected to a display screen, step 411 is performed; or if the output end of the bezel 4 is not connected to a display screen, step 412 is performed. It can be learned from FIG. 1 that the output end of the bezel 4 of the display screen 1 is connected to a display screen. Therefore, the display screen 1 performs step 411.

Step 411: Send the command 3 through an RS485 port of the bezel 4.

After determining that the output end of the bezel 4 is connected to a display screen, the display screen 1 may send the command 3 to the display screen through the RS485 port of the bezel 4. It can be learned from FIG. 1 that the display screen 1 is spliced with the display screen 6. Therefore, the display screen 1 sends the command 3 to the display screen 6 through the RS485 port of the bezel 4. The display screen 6 determines, according to the field 1 in the command 3, that the display screen 6 is in the same column as the display screen 1; and then determines, with reference to the field 2, that the number of the display screen 6 is the number of the display screen 1 plus the quantity 3 of display screens in the row direction. Therefore, the display screen 6 determines that the number of the display screen 6 is 4.

It can be learned, based on the agreement made at the beginning of this embodiment, that then the display screen 6 may determine whether the output end of the bezel 4 of the display screen 6 is connected to a display screen. It can be learned from FIG. 1 that the bezel 4 of the display screen 6 is not spliced with another display screen. Therefore, the display screen 6 may determine that the position of each display screen in the same column as the display screen 6 has been determined, and may determine that the quantity of display screens in the same column as the display screen 6 is 2.

Then the display screen 6 may determine whether the input end of the bezel 2 of the display screen 6 is connected to a display screen. It can be learned from FIG. 1 that the bezel 2 of the display screen 6 is spliced with the bezel 4 of the display screen 1. Therefore, the display screen 6 may send the command 4 to the display screen 1 through the RS485 port of the bezel 2.

After performing step 411, the display screen 1 performs step 404, that is, waits to receive a command. It can be learned based on the foregoing agreement that the display screen 1 receives the command 4 from the display screen 6. In other words, in step 405, the display screen 1 performs step 405 corresponding to the case 4. That is, the display screen 1 records the quantity of display screens in the column direction. After performing step 405 corresponding to the case 4, the display screen 1 may perform step 412.

Step 412 is. Determine whether the input end of the bezel 2 is connected to a display screen.

If the input end of the bezel 2 is connected to a display screen, step 413 is performed; or if the input end of the bezel 2 is not connected to a display screen, step 414 is performed. Step 413 is: Send a command 4 through an RS485 port of the bezel 2. It can be learned from FIG. 1 that the input end of the bezel 2 of the display screen 1 is not connected to a display screen. Therefore, the display screen 1 performs step 414.

Step 414: Determine a position of the display screen in the spliced display screen according to the corresponding number in the spliced display screen, the quantity of display screens in the row direction, and the quantity of display screens in the column direction, and displays a corresponding picture according to the position in the spliced display screen.

The display screen 1 may determine, according to the recorded quantity 3 of display screens in the row direction and the recorded quantity 3 of display screens in the column direction, that the display screen 1 displays one third of the entire picture in both the row direction and the column direction, and may determine, according to the number 1 of the display screen, a numbering rule, the quantity of display screens in the row direction, and the quantity of display screens in the column direction, that the display screen 1 is in the first row and the first column in the spliced display screen. Therefore, the display screen 1 can locate, in the entire picture, specific content of the one third of the picture that should be actually displayed, and finally display the determined one third of the picture.

The following uses the display screen 3 as an example to describe another embodiment of the display method 400 provided in the embodiments of this application. In this embodiment, when determining the position of the display screen in the spliced display screen, the display screen first generates an identifier, and finally determine, according to the identifier, the quantity of display screens in the row direction, and the quantity of electronic devices in the column direction, the position of the display screen in the spliced display screen. For example, the identifier may be a number, and the following rule may be followed when the number is generated: For example, for the six display screens in FIG. 1, numbers generated by the display screens in the first row from bottom to top are sequentially 1, 2, and 3 from left to right, and numbers generated by the display screens in the second row are sequentially 4, 5, and 6 from left to right. In addition, the following agreement is made in this embodiment: In FIG. 1, after each of the display screens in the first row and the first column from bottom to top determines, according to the display method 400, the number of the display screen, other display screens in the first row sequentially communicate rightward, so that other display screens in the first row sequentially determine, according to the display method 400, the numbers of the display screens, and then the display screens in the first row sequentially communicate upward, so that the display screens in each column sequentially determine, according to the display method 400, the numbers of the display screens.

Step 401: Determine a connection status of an input end.

For example, the display screen 3 may detect the port 1 and the port 2, to determine that the input end of the display screen 3 is connected to a display screen.

It can be learned from FIG. 1 that the bezel 1 of the display screen 3 is spliced with the bezel 3 of the display screen 2. Therefore, the display screen 3 can detect a high-level signal on the port 1. Therefore, the display screen 3 may determine that the input end of the bezel 1 is connected to a display screen.

Step 402: Determine whether the input end is connected to a display screen.

If the display screen 3 determines that the input end is not connected to a display screen, step 403 is performed; or if the display screen 3 determines that the input end is connected to a display screen, step 404 is performed. Step 403 is: Determine a number. For example, if the display screen 3 determines that the input end is not connected to any display screen, the display screen 3 may determine that a number of the display screen 3 is 1. It can be learned from the description in step 401 that the input end of the bezel 1 of the display screen 3 is connected to a display screen. Therefore, the display screen 3 performs step 404.

Step 404: Wait to receive a command.

In step 404, the display screen 1 receives one of the following four types of commands:

Command 1: A format of the command 1 is "field 1+field 2", where the field 1 represents that a type of the command 1 is a row direction command, and the field 2 represents a number of a display screen sending the command 1. It should be noted that when the type of the command is a row direction command, it represents that the display screen sending the command and the display screen receiving the command are in a same row.

Command 2: A format of the command 2 is "field 1+field 2+field 3", where the field 1 represents that a type of the command 2 is a row direction feedback command, the field 2 represents that the number of each display screen in the row direction has been determined, and the field 3 represents a quantity of display screens in the row direction.

Command 3: A format of the command 3 is "field 1+field 2", where the field 1 represents that a type of the command 3 is a column direction command, and the field 2 represents a number of a display screen sending the command 1 in the spliced display screen. It should be noted that when the type of the command is a column direction command, it indicates that the display screen sending the command and the display screen receiving the command are in a same column.

Command 4: A format of the command 4 is "field 1+field 2+field 3", where the field 1 represents that a type of the command 4 is a column direction feedback command, the field 2 represents that the number of each display screen in the column direction has been determined, and the field 3 represents a quantity of display screens in the column direction.

The display screen 3 performs step 405 after step 404. Because there are four types of commands in step 404, step 405 also includes four cases corresponding to the four types of commands. The display screen 3 will select, according to the received one of the four types of commands, step 405 corresponding to one of the following cases for execution:

Case 1: If the display screen 3 receives the command 1, step 405 is: The display screen 3 determines the number of the display screen 3 according to the command 1.

Case 2: If the display screen 3 receives the command 2, step 405 is: The display screen 3 records the quantity of display screens in the row direction according to the command 2.

Case 3: If the display screen 3 receives the command 3, step 405 is: The display screen 3 determines the number of the display screen 3 according to the command 3.

Case 4: If the display screen 3 receives the command 4, step 405 is: The display screen 3 records the quantity of display screens in the column direction according to the command 4.

It can be learned based on the agreement made at the beginning of this embodiment that the display screen 3 receives the command 1 from the display screen 2 in step 404. Therefore, for the four cases in step 405, the display screen 3 performs step 405 corresponding to the case 1. That is, the display screen 3 determines, according to the field 1 in the command 1 from the display screen 2, that the display screen 3 is in the same row as the display screen 2; and then determines, with reference to the field 2, that the number of the display screen 3 is the number of the display screen 2 plus 1. The display screen 3 determines that the number of the display screen 3 is 3. After performing step 405 corresponding to the case 1, the display screen 3 may perform step 406, that is, determine whether the output end of the bezel 3 is connected to a display screen.

If the output end of the bezel 3 is connected to a display screen, step 407 is performed; or if the output end of the bezel 3 is not connected to a display screen, step 408 is performed. Step 407 is: Send the command 1 through an RS485 port of the bezel 3. It can be learned from FIG. 1 that the output end of the bezel 3 of the display screen 3 is not connected to a display screen. Therefore, the display screen 1 performs step 408. It should be noted that when the display screen 3 determines that the output end of the bezel 3 is not connected to a display screen, the display screen 3 may determine that the number of each display screen in the row direction has been determined, and may determine that the quantity of display screens in the row direction is 3, and the display screen 3 may record the quantity of display screens in the row direction.

Step 408: Determine whether the input end of the bezel 1 is connected to a display screen.

If the input end of the bezel 1 is connected to a display screen, step 409 is performed; or if the input end of the bezel 1 is not connected to a display screen, step 410 is performed. Step 409 is: Send a command 2 through an RS485 port of the bezel 1. It can be learned from FIG. 1 that the input end of the bezel 1 of the display screen 1 is connected to a display screen. Therefore, the display screen 1 performs step 409.

Step 409: Send the command 2 through an RS485 port of the bezel 1.

When the display screen 3 determines that the input end of the bezel 1 is connected to a display screen, the display screen 3 may send the command 2 to the display screen. It can be learned from FIG. 1 that the bezel 1 of the display screen 3 is spliced with the display screen 2. Therefore, the display screen 3 may send the command 2 to the display screen 2 through the RS485 port of the bezel 1. The display screen 2 determines, according to the field 1 in the command 2, that the display screen 2 is in the same row as the display screen 1: determines, according to the field 2, that the number of each display screen in the row direction has been determined; and then determines, with reference to the field 3, the quantity of display screens in the row direction is 3. The display screen 2 may store the quantity of display screens in the row direction.

After performing step 409, the display screen 3 may perform step 410.

Step 410: Determine whether an output end of the bezel 4 is connected to a display screen.

If the output end of the bezel 4 is connected to a display screen, step 411 is performed; or if the output end of the bezel 4 is not connected to a display screen, step 412 is performed. Step 412 is: Determine whether the input end of the bezel 2 is connected to a display screen. It can be learned from FIG. 1 that the output end of the bezel 4 of the display screen 3 is connected to a display screen. Therefore, the display screen 3 performs step 411.

Step 411: Send the command 3 through an RS485 port of the bezel 4.

When the display screen 3 determines that the output end of the bezel 4 is connected to a display screen, the display screen 3 may send the command 3 to the display screen. It can be learned from FIG. 1 that the bezel 4 of the display screen 3 is spliced with the display screen 4. Therefore, the display screen 3 may send the command 3 to the display screen 4 through the RS485 port of the bezel 4. The display screen 4 determines, according to the field 1 in the command 3, that the display screen 4 is in the same column as the display screen 3; and then determines, according to the field 2 and the field 3, that the number of the display screen 4 is the number of the display screen 3 plus the quantity of display screens in the row direction. Therefore, the display screen 4 determines that the number of the display screen 4 is 6.

After performing step 411, the display screen 3 performs step 404, that is, waits to receive a command. It can be learned, based on the agreement made at the beginning of this embodiment, that the display screen 3 receives the command 4 from the display screen 4 in step 404. Therefore, for the four cases in step 405, the display screen 3 performs step 405 corresponding to the case 4. That is, the display screen 3 records the quantity of display screens in the column direction. After performing step 405 corresponding to the case 4, the display screen 3 may perform step 412, that is, determines whether the input end of the bezel 2 is connected to a display screen.

If the input end of the bezel 2 is connected to a display screen, step 413 is performed; or if the input end of the bezel 2 is not connected to a display screen, step 414 is performed. Step 413 is: Send a command 4 through an RS485 port of the bezel 2. It can be learned from FIG. 1 that the input end of the bezel 2 of the display screen 3 is not connected to a display screen. Therefore, the display screen 3 performs step 414.

Step 414: Determine a position of the display screen in the spliced display screen according to the corresponding number in the spliced display screen, the quantity of display screens in the row direction, and the quantity of display screens in the column direction, and displays a corresponding picture according to the position in the spliced display screen.

The display screen 3 may determine, according to the recorded quantity 3 of display screens in the row direction and the recorded quantity 3 of display screens in the column direction, that the display screen 3 displays one third of the entire picture in both the row direction and the column direction, and may determine, according to the number 3 of the display screen 3, a numbering rule, the quantity of display screens in the row direction, and the quantity of display screens in the column direction, that the display screen 3 is in the first row and the third column in the spliced display screen. Therefore, the display screen 3 can locate specific content of the one third of the picture that should be actually displayed in the entire picture, and finally display the determined one third of the picture.

Figure 6:
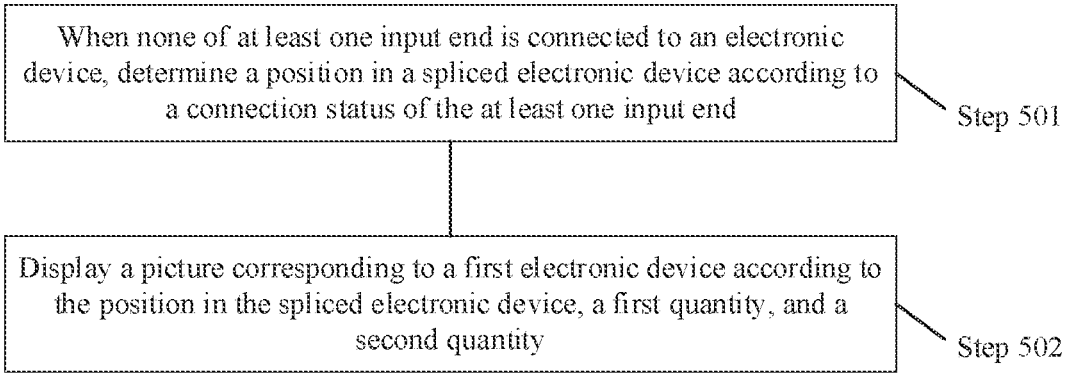
FIG. 6 is still another example of a schematic flowchart of a display method according to an embodiment of this application.

The following describes a display method 500 provided in an embodiment of this application. It should be noted that the display method may be performed by any one of a plurality of electronic devices included in the spliced electronic device. In other words, the plurality of electronic devices determine positions of the electronic devices in the spliced electronic device. Therefore, the following uses one of the plurality of electronic devices as an example to describe the display method provided in this embodiment of this application. For ease of description, the electronic device is denoted as a first electronic device. FIG. 6 is an example flowchart of the display method 500 according to this embodiment of this application.

Step 501: When none of at least one input end of the first electronic device is connected to an electronic device, the first electronic device determines a position of the first electronic device in the spliced electronic device according to a connection status of the at least one input end.

Step 502: The first electronic device displays a picture corresponding to the first electronic device according to the position of the first electronic device in the spliced electronic device, a first quantity, and a second quantity, where the first quantity is a quantity of electronic devices in a row direction in which the first electronic device is located, and the second quantity is a quantity of electronic devices in a column direction in which the first electronic device is located.

Based on the display method provided in this embodiment of this application, the first electronic device determines the position of the first electronic device in the spliced electronic device, and determines, according to the position, the quantity of the electronic devices in the row direction in which the first electronic device is located, and the quantity of the electronic devices in the column direction in which the first electronic device is located, content that should be displayed, to avoid display disorder. In addition, the first electronic device can determine the position of the first electronic device in the spliced electronic device based only on a connection status of an input end. It can be learned that when the first electronic device determines the position of the another electronic device in the spliced electronic device, neither manual intervention nor participation of another device is required. Therefore, the display method provided in this embodiment of this application has relatively low complexity and costs while avoiding display disorder.

When the first electronic device is powered on for the first time or receives a command for determining the position of the first electronic device, the first electronic device may determine the position of the first electronic device in the spliced electronic device. When determining the position, the first electronic device first needs to determine whether each input end is connected to an electronic device. When determining that no input end is connected to an electronic device, the first electronic device may determine the position of the first electronic device in the spliced electronic device according to a connection status of the input end.

For example, the first electronic device may determine the connection status of the input end in the following manner:

One first interface may be deployed at each input end of the first electronic device, and the first electronic device may determine, according to whether a high-level signal can be detected at the first interface, whether the input end is connected to an electronic device.

For example, the first electronic device includes two input ends, which are respectively denoted as a first input end and a second input end. One first interface is deployed at each of the first input end and the second input end of the first electronic device. The first electronic device does not detect a high-level signal at the first interface deployed at the first input end or at the first interface deployed at the second input end. In this case, the first electronic device may determine that neither the first input end nor the second input end is connected to any electronic device.

It should be noted that the first input end may be the input end deployed on the bezel 1, the second input end may be the input end deployed on the bezel 2, the first interface deployed on the first input end may be the interface 1, and the first interface deployed on the second input end may be the interface 2.

When no input end of the first electronic device is connected to an electronic device, the first electronic device may determine, according to a connection status of the input end, the position of the first electronic device in the spliced electronic device. In this case, there are the following two cases.

Case 1. When the first electronic device determines that no input end is connected to an electronic device, the first electronic device may directly determine the position of the first electronic device in the spliced electronic device.

For example, the first electronic device determines that the first electronic device is in the first row and the first column from bottom to top in the spliced electronic device.

Case 2: When the first electronic device determines that no input end is connected to an electronic device, the first electronic device may determine an identifier of the first electronic device according to the identifier, and determine the position of the first electronic device in the spliced electronic device according to the identifier, the first quantity, and the second quantity.

For example, the identifier may be a number. When the first electronic device determines that no input end is connected to an electronic device, the first electronic device may determine that the number of the first electronic device is 1, and then the first electronic device may determine, according to the number, the first quantity, and the second quantity, that the first electronic device is in the first row and the first column from bottom to top in the spliced electronic device.

The following continues to describe the method 500 corresponding to the case 1.

For example, after determining the position of the first electronic device in the spliced electronic device, the first electronic device may determine the connection status of the output end in the following manner:

One second interface may be deployed at each output end of the first electronic device, and the first electronic device may determine a connection status of the output end according to a connection status of the second interface.

For example, the first electronic device includes two output ends, which are respectively denoted as a first output end and a second output end. One second interface is deployed at each of the first output end and the second output end of the first electronic device, and the first electronic device detects high-level signals at both the second interface deployed at the first output end and the second interface deployed at the second output end. In this case, the first electronic device may determine that each of the first output end and the second output end is connected to an electronic device.

It should be noted that the first output end may be the output end deployed on the bezel 3, the second output end may be the output end deployed on the bezel 4, the second interface deployed on the first output end may be the interface 3, and the second interface deployed on the second output end may be the interface 4.

It should be noted that the first electronic device may be the display screen 1 in the foregoing method 300, the second electronic device may be the display screen 2 in the foregoing method 300, and the second control command may be the command 1 that is sent through the RS485 port deployed on the bezel 3 of the display screen 1 in the foregoing method 300.

For example, after determining the connection status of the output end, the first electronic device may send, when the first output end of the first electronic device is connected to an electronic device, the second control command to the electronic device connected to the first electronic device. For example, if the first output end of the first electronic device is connected to the second electronic device, the first electronic device sends the second control command to the second electronic device, where the second control command indicates that the first electronic device and the second electronic device are in a same row, and indicates the position of the first electronic device in the spliced electronic device. The second electronic device may determine the position of the second electronic device in the spliced electronic device according to the second control command.

It should be noted that the first electronic device may be the display screen 1 in the foregoing method 300, the second electronic device may be the display screen 2 in the foregoing method 300, and the second control command may be the command 1 that is sent through the RS485 port deployed on the bezel 3 of the display screen 1 in the foregoing method 300.

For example, after sending the second control command to the second electronic device, the first electronic device may receive a first feedback command from the second electronic device, where the first feedback command indicates that the position of each electronic device in a same row as the second electronic device has been determined, and indicates the first quantity.

It should be noted that the first electronic device may be the display screen 1 in the foregoing method 300, the second electronic device may be the display screen 2 in the foregoing method 300, and the first feedback command may be the command 2 that is sent through the RS485 port deployed on the bezel 1 of the display screen 2 in the foregoing method 300.

For example, after determining the position of the first electronic device in the spliced electronic device, the first electronic device may send, when the second output end of the first electronic device is connected to an electronic device, the third control command to the electronic device connected to the first electronic device. For example, if the second output end of the first electronic device is connected to a fourth electronic device, the first electronic device sends the third control command to the fourth electronic device, where the third control command indicates that the first electronic device and the fourth electronic device are in a same column, and indicates the position of the first electronic device in the spliced electronic device. The fourth electronic device may determine the position of the fourth electronic device in the spliced electronic device according to the third control command.

It should be noted that the first electronic device may be the display screen 1 in the foregoing method 300, the fourth electronic device may be the display screen 6 in the foregoing method 300, and the third control command may be the command 3 that is sent through the RS485 port deployed on the bezel 4 of the display screen 1 in the foregoing method 300.

For example, after sending the third control command to the fourth electronic device, the first electronic device may receive a second feedback command from the fourth electronic device, where the second feedback command indicates that the position of each electronic device in a same column as the fourth electronic device has been determined, and indicates the second quantity.

It should be noted that the first electronic device may be the display screen 1 in the foregoing method 300, the fourth electronic device may be the display screen 6 in the foregoing method 300, and the second feedback command may be the command 4 that is sent through RS485 port deployed on the bezel 2 of the display screen 6 in the foregoing method 300.

In step 502, the first electronic device displays a picture corresponding to the first electronic device according to the position of the first electronic device in the spliced electronic device, a first quantity, and a second quantity.

The first quantity herein may be obtained by the first electronic device from the first feedback command, and the second quantity may be obtained by the first electronic device from the second feedback command.

In addition, the first quantity may alternatively be obtained by the first electronic device in another manner, for example, the user may manually enter the first quantity on the first electronic device; and the second quantity may alternatively be obtained by the first electronic device in another manner, for example, the user may manually enter the second quantity on the first electronic device. This is not limited in this embodiment of this application.

The following further describes the method 500 corresponding to the case 2 based on an assumption that the first electronic device includes two input ends and two output ends.

For example, after determining the position of the first electronic device in the spliced electronic device, the first electronic device may determine the connection status of the output end. For a method for determining the connection status of the output end by the first electronic device, refer to related descriptions in the method 500. For brevity, details are not described herein again.

For example, after determining the connection status of the output end, the first electronic device may send, when the first output end of the first electronic device is connected to an electronic device, the second control command to the electronic device connected to the first electronic device. For example, if the first output end of the first electronic device is connected to the second electronic device, the first electronic device sends the second control command to the second electronic device, where the second control command indicates that the first electronic device and the second electronic device are in a same row, and indicates the number of the first electronic device. The second electronic device may determine the position of the second electronic device in the spliced electronic device according to the second control command, the first quantity, and the second quantity.

It should be noted that the first electronic device may be the display screen 1 in the foregoing method 400, the second electronic device may be the display screen 2 in the foregoing method 400, and the second control command may be the command 1 that is sent through the RS485 port deployed on the bezel 3 of the display screen 1 in the foregoing method 400.

For example, after sending the second control command to the second electronic device, the first electronic device may receive a first feedback command from the second electronic device, where the first feedback command indicates that the position of each electronic device in a same row as the second electronic device has been determined, and indicates the first quantity.

It should be noted that the first electronic device may be the display screen 1 in the method 400, the second electronic device may be the display screen 2 in the method 400, and the first feedback command may be the command 2 that is sent through the RS485 port deployed on the bezel 1 of the display screen 2.

For example, after determining the position of the first electronic device in the spliced electronic device, the first electronic device may send, when the second output end of the first electronic device is connected to an electronic device, the third control command to the electronic device connected to the first electronic device. For example, if the second output end of the first electronic device is connected to a fourth electronic device, the first electronic device sends the third control command to the fourth electronic device, where the third control command indicates that the first electronic device and the fourth electronic device are in a same column, and indicates the number of the first electronic device. The fourth electronic device may determine the number of the fourth electronic device according to the third control command.

It should be noted that the first electronic device may be the display screen 1 in the foregoing method 400, the fourth electronic device may be the display screen 6 in the foregoing method 400, and the third control command may be the command 3 that is sent through the RS485 port deployed on the bezel 4 of the display screen 1 in the foregoing method 400.

For example, after sending the third control command to the fourth electronic device, the first electronic device may receive a second feedback command from the fourth electronic device, where the second feedback command indicates that the position of each electronic device in a same column as the fourth electronic device has been determined, and indicates the second quantity.

It should be noted that the first electronic device may be the display screen 1 in the foregoing method 400, the fourth electronic device may be the display screen 6 in the foregoing method 400, and the second feedback command may be the command 4 that is sent through RS485 port deployed on the bezel 2 of the display screen 6 in the foregoing method 400.

In step 502, the first electronic device displays a picture corresponding to the first electronic device according to the position of the first electronic device in the spliced electronic device, a first quantity, and a second quantity.

Figure 7:
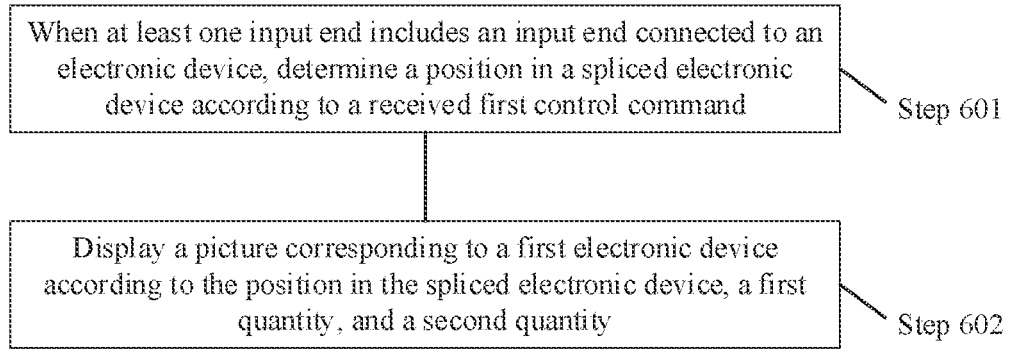
FIG. 7 is still another example of a schematic flowchart of a display method according to an embodiment of this application.

The following describes a display method 600 provided in an embodiment of this application. FIG. 7 is an example flowchart of the display method 600 according to this embodiment of this application.

Step 601: When the at least one input end of the first electronic device includes an input end connected to an electronic device, determine a position in the spliced electronic device according to a received first control command, where the first control command indicates a position of an electronic device sending the first control command in the spliced electronic device, and indicates that the electronic device sending the first control command and the first electronic device are located in a same row or a same column, and the electronic device sending the first control command is connected to the first electronic device through one of the at least one input end.

Step 602: The first electronic device displays a picture corresponding to the first electronic device according to the position of the first electronic device in the spliced electronic device, a first quantity, and a second quantity, where the first quantity is a quantity of electronic devices in a row direction in which the first electronic device is located, and the second quantity is a quantity of electronic devices in a column direction in which the first electronic device is located.

Based on the display method provided in this embodiment of this application, the first electronic device determines the position of the first electronic device in the spliced electronic device, and determines, according to the position, the quantity of the electronic devices in the row direction in which the first electronic device is located, and the quantity of the electronic devices in the column direction in which the first electronic device is located, content that should be displayed, to avoid display disorder. In addition, the first electronic device can determine the position of the first electronic device in the spliced electronic device based on both a connection status of an input end and a control command from another electronic device, where the control command indicates a position of the another electronic device in the spliced electronic device. It can be learned that when the first electronic device determines the position of the another electronic device in the spliced electronic device, neither manual intervention nor participation of another device is required. Therefore, the display method provided in this embodiment of this application has relatively low complexity and costs while avoiding display disorder.

When the first electronic device is powered on for the first time or receives a command for determining the position of the first electronic device, the first electronic device may determine the position of the first electronic device in the spliced electronic device. When determining the position of the first electronic device, the first electronic device first needs to determine whether each input end is connected to an electronic device. When the first electronic device determines that the at least one input end includes an input end connected to an electronic device, the first electronic device may wait to receive a first control command from one of the at least one electronic device connected to the first electronic device. After receiving the first control command, the first electronic device may determine the position of the first electronic device in the spliced electronic device according to the first control command.

For example, the first electronic device includes two input ends, which are respectively denoted as a first input end and a second input end. In this case, there are the following two cases for the first control command.

Case 1: The first control command comes from a third electronic device that is connected to the first electronic device through a first input end, and the third electronic device and the first electronic device are in a same row.

After the first electronic device receives the first control command from the third electronic device, the first electronic device may determine the position of the first electronic device in the spliced electronic device according to the first control command.

For example, the first control command indicates that the third electronic device is in the first row and the second column in the spliced electronic device, and indicates that the third electronic device and the first electronic device are in a same row. In this case, the first electronic device may determine, according to the first control command, that the first electronic device is in the first row and the third column in the spliced electronic device.

It should be noted that the first electronic device may be the display screen 3 in the foregoing method 300, the third electronic device may be the display screen 2 in the foregoing method 300, and the first control command may be the command 1 that is sent through the RS485 port deployed on the bezel 3 of the display screen 2 in the foregoing method 300.

For example, it is assumed that the first electronic device includes two output ends, which are respectively denoted as a first output end and a second output end. After determining the position of the first electronic device in the spliced electronic device according to the first control command, the first electronic device may send, when the first output end is connected to an electronic device, a second control command to the electronic device that is connected to the first electronic device through the first output end, where the second control command indicates that the first electronic device is in a same row as the electronic device, and indicates the position of the first electronic device in the spliced electronic device.

For example, the first output end of the first electronic device is connected to a second electronic device. In this case, after determining the position of the first electronic device in the spliced electronic device, the first electronic device may send the second control command to the second electronic device, where the second control command indicates that the first electronic device and the second electronic device are in a same row, and indicates the position of the first electronic device in the spliced electronic device. The second electronic device determines the position of the second electronic device in the spliced electronic device according to the second control command.

For example, after sending the second control command to the second electronic device, the first electronic device may receive a first feedback command from the second electronic device, where the first feedback command indicates that the position of each electronic device in a same row as the second electronic device has been determined, and indicates the first quantity.

For example, after receiving the first feedback command from the second electronic device, the first electronic device may send, when the first input end of the first electronic device is connected to an electronic device, the first feedback command to the electronic device connected to the first electronic device. For example, if the first input end of the first electronic device is connected to a third electronic device, the first electronic device sends the first feedback command to the third electronic device, where the first feedback command indicates that the position of each electronic device in a same row as the first electronic device has been determined, and indicates the first quantity.

It should be noted that the first electronic device may be the display screen 3 in the foregoing method 300, the third electronic device may be the display screen 2 in the foregoing method 300, and the first feedback command may be the command 2 that is sent through the RS485 port deployed on the bezel 1 of the display screen 3 in the foregoing method 300.

For example, after determining the position of the first electronic device in the spliced electronic device according to the first control command, the first electronic device may send, when the second output end of the first electronic device is connected to an electronic device, the third control command to the electronic device connected to the first electronic device. For example, if the second output end of the first electronic device is connected to a fourth electronic device, the first electronic device sends the third control command to the fourth electronic device, where the third control command indicates that the first electronic device and the fourth electronic device are in a same column, and indicates the position of the first electronic device in the spliced electronic device. The fourth electronic device may determine the position of the fourth electronic device in the spliced electronic device according to the third control command.

It should be noted that the first electronic device may be the display screen 3 in the foregoing method 300, the fourth electronic device may be the display screen 4 in the foregoing method 300, and the third control command may be the command 3 that is sent through the RS485 port deployed on the bezel 4 of the display screen 3 in the foregoing method 300.

For example, after sending the third control command to the fourth electronic device, the first electronic device may receive a second feedback command from the fourth electronic device, where the second feedback command indicates that the position of each electronic device in a same column as the fourth electronic device has been determined, and indicates the second quantity.

It should be noted that the first electronic device may be the display screen 3 in the foregoing method 300, the fourth electronic device may be the display screen 4 in the foregoing method 300, and the second feedback command may be the command 4 that is sent through RS485 port deployed on the bezel 2 of the display screen 4 in the foregoing method 300.

For example, after receiving the second feedback command from the fourth electronic device, the first electronic device may send, when the second input end is connected to an electronic device, the second feedback command to the electronic device connected to the first electronic device. For example, the second input end of the first electronic device is connected to a fifth electronic device. In this case, the first electronic device may further send the second feedback command to the fifth electronic device after receiving the second feedback command from the fourth electronic device, where the second feedback command indicates that the position of each electronic device in a same column as the first electronic device has been determined, and indicates the second quantity.

Case 2: The first control command comes from a fifth electronic device that is connected to the first electronic device through a second input end, and the fifth electronic device and the first electronic device are in a same column.

After the first electronic device receives the first control command from the fifth electronic device, the first electronic device may determine the position of the first electronic device in the spliced electronic device according to the first control command.

For example, the first control command indicates that the fifth electronic device is in the first row and the third column in the spliced electronic device, and indicates that the fifth electronic device and the first electronic device are in a same column. In this case, the first electronic device may determine, according to the first control command, that the first electronic device is in the second row and the third column in the spliced electronic device.

For example, it is assumed that the first electronic device includes two output ends, which are respectively denoted as a first output end and a second output end. After determining the position of the first electronic device in the spliced electronic device according to the first control command, the first electronic device may send a third control command to the electronic device that is connected to the first electronic device through the second output end, where the third control command indicates that the first electronic device is in a same column as the electronic device, and indicates the position of the first electronic device in the spliced electronic device.

For example, the second output end of the first electronic device is connected to a fourth electronic device. In this case, after determining the position of the first electronic device in the spliced electronic device, the first electronic device may send the third control command to the fourth electronic device. The fourth electronic device may determine the position of the fourth electronic device in the spliced electronic device according to the third control command.

For example, after sending the third control command to the fourth electronic device, the first electronic device may receive a second feedback command from the fourth electronic device, where the second feedback command indicates that the position of each electronic device in a same column as the fourth electronic device has been determined, and indicates the second quantity.

For example, after receiving the second feedback command from the fourth electronic device, the first electronic device may send, when the second input end is connected to an electronic device, the second feedback command to the electronic device connected to the first electronic device. For example, the second input end of the first electronic device is connected to a fifth electronic device. In this case, the first electronic device may further send the second feedback command to the fifth electronic device after receiving the second feedback command from the fourth electronic device, where the second feedback command indicates that the position of each electronic device in a same column as the first electronic device has been determined, and indicates the second quantity.

In step 602, the first electronic device displays a picture corresponding to the first electronic device according to the position of the first electronic device in the spliced electronic device, a first quantity, and a second quantity.

It should be noted that the foregoing descriptions of the first control command, the second control command, and the third control command are merely used as examples for description, and do not constitute a limitation on the embodiments of this application. In specific implementation, the first control command may indicate that the third electronic device and the first electronic device are in a same row, and indicate an identifier of the third electronic device; the second control command may indicate that the first electronic device and the second electronic device are in a same row, and indicate an identifier of the first electronic device; and the third control command may indicate that the first electronic device and the fourth electronic device are in a same column, and indicates an identifier of the first electronic device.

The first electronic device is as an example. When the first electronic device receives the first control command from the third electronic device, the first control command may indicate that the third electronic device and the first electronic device are in a same row, and indicate the identifier of the third electronic device; the first electronic device may determine that the third electronic device and the first electronic device are in a same row; and the first electronic device may determine the identifier of the first electronic device according to the identifier of the third electronic device. Finally, the first electronic device may determine the position of the first electronic device in the spliced electronic device according to the identifier of the first electronic device, the first quantity, and the second quantity.

For example, the identifier may be a number, the first control command indicates that the number of the third electronic device is 1, and the first electronic device determines, according to the first control command, that the third electronic device and the first electronic device are in a same row. Therefore, the first electronic device may determine that the number of the first electronic device is 2; and then the first electronic device may determine the position of the first electronic device in the spliced electronic device with reference to the first quantity and the second quantity. For details, refer to the foregoing related descriptions. For brevity, details are not described herein again.

In this embodiment of this application, the first quantity may be obtained by the first electronic device from the first feedback command, and the second quantity may be obtained by the first electronic device from the second feedback command.

In addition, the first quantity may alternatively be obtained by the first electronic device in another manner, for example, the user may manually enter the first quantity on the first electronic device; and the second quantity may alternatively be obtained by the first electronic device in another manner, for example, the user may manually enter the second quantity on the first electronic device. This is not limited in this embodiment of this application.

In this embodiment, the electronic device may be divided into functional modules based on the foregoing method examples. For example, each functional module corresponding to each function may be obtained through division, or two or more functions may be integrated into one processing module. The integrated module may be implemented in a form of hardware. It should be noted that module division in this embodiment is an example and is merely logical function division. In actual implementation, there may be another division manner.

It should be noted that all related content of the steps in the foregoing method embodiments may be cited in function description of corresponding functional modules. Details are not described herein.

The electronic device provided in this embodiment is configured to perform the foregoing display methods, and therefore can achieve the same effects as the foregoing implementation methods. When an integrated unit is used, the electronic device may include a processing module, a storage module, and a communication module. The processing module may be configured to control and manage an action of the electronic device. For example, the processing module may be configured to support the electronic device in performing steps performed by a processing unit. The storage module may be configured to support the electronic device in storing program code, data, and the like. The communication module may be configured to support communication between the electronic device and another device.

The processing module may be a processor or a controller. The processor may implement or execute various example logical blocks, modules, and circuits described with reference to content disclosed in this application. The processor may also be a combination for implementing computing functions, for example, a combination of one or more microprocessors, a combination of a digital signal processor (digital signal processor, DSP) and a microprocessor. The storage module may be a memory.

In an embodiment, when the processing module is a processor and the storage module is a memory, the electronic device in this embodiment may be a device having the structure shown in FIG. 2.

An embodiment further provides a computer-readable storage medium. The computer-readable storage medium stores computer commands. When the computer commands are run on an electronic device, the electronic device is enabled to perform the foregoing related method steps to implement the display methods in the foregoing embodiments.

An embodiment further provides a computer program product. When the computer program product runs on a computer, the computer is enabled to perform the foregoing related steps, to implement the display method in the foregoing embodiments.

In addition, an embodiment of this application further provides an apparatus. The apparatus may be specifically a chip, a component, or a module, and the apparatus may include a processor and a memory that are connected. The memory is configured to store computer-executable commands. When the apparatus runs, the processor may execute the computer-executable commands stored in the memory, to enable a chip to perform the display methods in the foregoing method embodiments.

The electronic device, the computer storage medium, the computer program product, or the chip provided in embodiments is configured to perform the corresponding method provided above. Therefore, for beneficial effects that can be achieved, refer to the beneficial effects of the corresponding method provided above. Details are not described herein again.

Based on the descriptions about the foregoing implementations, a person skilled in the art may understand that, for a purpose of convenient and brief description, division into the foregoing functional modules is used as an example for illustration. In actual application, the foregoing functions may be allocated to different functional modules and implemented based on requirements. In other words, an inner structure of an apparatus is divided into different functional modules to implement all or some of the functions described above.

In the several embodiments provided in this application, it should be understood that the disclosed apparatus and method may be implemented in other manners. For example, the described apparatus embodiment is merely an example.

For example, division into modules or units is merely logical function division and may be another division manner in actual implementation. For example, a plurality of units or components may be combined or integrated into another apparatus, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate. The parts displayed as units may be one or more physical units, which may be located in one place, or may be distributed on different places. Some or all of the units may be selected according to actual needs to achieve the purpose of the solutions in embodiments.

In addition, functional units in embodiments of this application may be integrated into one processing unit, each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium. Based on such an understanding, the technical solutions in embodiments of this application essentially, or the part contributing to the prior art, or all or some of the technical solutions may be implemented in the form of a software product. The software product is stored in a storage medium and includes several commands for instructing a device (which may be a single-chip microcomputer, a chip, or the like) or a processor (processor) to perform all or some of the steps of the methods described in embodiments of this application. The foregoing storage medium includes any medium that can store program code, for example, a USB flash drive, a removable hard disk, a read-only memory (read-only memory, ROM), a random access memory (random access memory, RAM), a magnetic disk, or an optical disc.

The foregoing descriptions are merely specific implementations of this application, but are not intended to limit the protection scope of this application. Any variation or replacement readily figured out by a person skilled in the art in the technical scope disclosed in this application shall fall within the protection scope of this application. Therefore, the protection scope of this application shall be subject to the protection scope of the claims.

What is claimed is:

1. A method implemented by a first electronic device of a plurality of electronic devices, wherein the method comprises:
    either determining, based on a connection status of at least one input end of the first electronic device, a first position of the first electronic device in a spliced electronic device when the first electronic device does not detect a high-level signal at a first interface deployed at the at least one input end; or determining, according to a received first control command from a second electronic device coupled to the first electronic device through a first input end of the at least one input end, the first position of the first electronic device in the spliced electronic device when the at least one input end comprises a second input end coupled to the second electronic device, wherein the first control command indicates a second position of the second electronic device in the spliced electronic device and indicates that the second electronic device and the first electronic device are in a same row or a same column; and
    displaying an image corresponding to the first electronic device according to the first position, a first quantity of the electronic devices in a row direction of the first electronic device, and a second quantity of the electronic devices in a column direction of the first electronic device.

2. The method of claim 1, wherein the first electronic device comprises at least one output end including a first output end coupled to a third electronic device, and wherein the method further comprises sending, to the third electronic device, a second control command indicating that the first electronic device and the third electronic device are in a same row and indicating the first position.

3. The method of claim 2, further comprising receiving, from the third electronic device, a first feedback command indicating a third position of each electronic device in a same row as the third electronic device and indicating the first quantity.

4. The method of claim 3, wherein the first electronic device comprises at least two input ends including a third input end coupled to a fourth electronic device, and wherein the method further comprises sending, to the fourth electronic device, the first feedback command when the first input end is coupled to the second electronic device.

5. The method of claim 4, wherein the first electronic device comprises two output ends including a second output end coupled to a fifth electronic device, and wherein the method further comprises sending, to the fifth electronic device, a third control command indicating that the first electronic device and the fifth electronic device are in a same column and indicating the first position.

6. The method of claim 5, further comprising receiving, from the fifth electronic device, a second feedback command indicating that a fourth position of each electronic device in a same column as the fifth electronic device has been determined and indicating the second quantity.

7. The method of claim 6, wherein the first electronic device comprises two input ends including a fourth input end coupled to a sixth electronic device, and wherein the method further comprises sending, to the sixth electronic device, the second feedback command.

8. The method of claim 7, wherein a first interface is deployed at each input end, and wherein the method further comprises determining that a fifth input end at which the first interface is deployed is coupled to a seventh electronic device when detecting a high-level signal on the first interface.

9. The method of claim 8, further comprising determining that an output end at which the second interface is deployed is coupled to an eighth electronic device when detecting a high-level signal on the second interface.

10. A first electronic device, comprising:
    at least one input end comprising a first input end and a second input end;
    a display screen configured to display a picture corresponding to the first electronic device; and
    one or more processors coupled to the display screen and configured to:
        either determine, based on a connection status of at least one input end of the first electronic device, a first position of the first electronic device in a spliced electronic device when the first electronic device does not detect a high-level signal at a first interface deployed at the at least one input end; or determine, according to a first control command from a second electronic device coupled to the first electronic device through a first input end of the at least one input end, the first position of the first electronic device in the spliced electronic device when the at least one input end comprises a second input end coupled to the second electronic device, wherein the first control command indicates a second position of the second electronic device in the spliced electronic device and indicates that the second electronic device and the first electronic device are in a same row or a same column; and display a picture corresponding to the electronic device according to the first position or the second position, a first quantity of electronic devices in a row direction of the first electronic device, and a second quantity of the electronic devices in a column direction of the electronic device.

11. The first electronic device of claim 10, further comprising at least one output end including a first output end coupled to a third electronic device, wherein the one or more processors are further configured to send, to the third electronic device, a second control command indicating that the electronic device and the third electronic device are in a same row and indicating the first position.

12. The first electronic device of claim 11, wherein the one or more processors are further configured to receive, from the third electronic device, a first feedback command indicating a third position of each electronic device in a same row as the third electronic device and indicating the first quantity.

13. The first electronic device of claim 12, further comprising at least two input ends including a third input end coupled to a fifth electronic device, wherein the one or more processors are further configured to send, to the fifth electronic device, the first feedback command when the first input end is coupled to the second electronic device.

14. The first electronic device of claim 13, further comprising two output ends including a second output end coupled to a fourth electronic device, wherein the one or more processors are further configured to send, to the fifth electronic device, a third control command indicating that the first electronic device and the fourth electronic device are in a same column and indicating the first position.

15. The first electronic device of claim 14, wherein the one or more processors are further configured to receive, from the fifth electronic device, a second feedback command indicating that a fourth position of each electronic device in a same column as the fifth electronic device has been determined, and the second quantity.

16. The first electronic device of claim 15, further comprising two input ends including a fourth input end coupled to a sixth electronic device, wherein the one or more processors are further configured to send, to the sixth electronic device, the second feedback command.

17. The first electronic device of claim 16, wherein a first interface is deployed at each input end, and wherein the one or more processors are further configured to determine that a fifth input end at which the first interface is deployed is coupled to a seventh electronic device when detecting a high-level signal on the first interface.

18. The first electronic device of claim 17, wherein the one or more processors are further configured to determine that an output end at which the second interface is deployed is coupled to an eighth electronic device when detecting a high-level signal on the second interface.

19. A computer program product comprising computer-executable instructions that are stored on a non-transitory computer storage medium and that, when executed by one or more processors, cause a first electronic device to:

either determine, based on a connection status of at least one input end of the first electronic device, a first position of the first electronic device in a spliced electronic device when the first electronic device does not detect a high-level signal at a first interface deployed at the at least one input end; or determine, according to a first control command from a second electronic device coupled to the first electronic device through a first input end of the at least one input end, the first position of the first electronic device in the spliced electronic device when the at least one input end comprises a second input end coupled to the second electronic device, wherein the first control command indicates a second position of the second electronic device in the spliced electronic device and indicates that the second electronic device and the first electronic device are in a same row or a same column; and display an image corresponding to the first electronic device according to the first position, a first quantity of the electronic devices in a row direction of the first electronic device, and a second quantity of the electronic devices in a column direction of the first electronic device.

20. The computer program product claim 19, wherein the first electronic device comprises at least one output end including a first output end coupled to a third electronic device, and wherein the computer-executable instructions, when executed by the one or more processors, cause the first electronic device to send, to the third electronic device, a second control command indicating that the first electronic device and the third electronic device are in a same row and indicating indicates the first position and the second position.

* * * * *